United States Patent
Katoh et al.

(10) Patent No.: US 7,482,109 B2
(45) Date of Patent: *Jan. 27, 2009

(54) OPTICAL INFORMATION RECORDING MEDIUM

(75) Inventors: Masaki Katoh, Sagamihara (JP); Yuki Nakamura, Zama (JP); Katsuyuki Yamada, Zama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/062,912

(22) Filed: Jan. 31, 2002

(65) Prior Publication Data

US 2003/0044719 A1    Mar. 6, 2003

(30) Foreign Application Priority Data

| Feb. 1, 2001 | (JP) | ............................. 2001-026094 |
| Mar. 9, 2001 | (JP) | ............................. 2001-067689 |
| Mar. 22, 2001 | (JP) | ............................. 2001-083650 |
| Mar. 22, 2001 | (JP) | ............................. 2001-083651 |

(51) Int. Cl.
*G11B 7/24* (2006.01)

(52) U.S. Cl. ............... 430/270.13; 430/945; 369/275.4; 369/275.2; 428/64.5; 428/64.6

(58) Field of Classification Search ................. 430/945, 430/270.13; 428/64.6; 369/275.5, 275.2
See application file for complete search history.

(56) References Cited

U.S. PATENT DOCUMENTS 5,100,700 A * 3/1992 Ide et al. .................... 428/64.6

(Continued)

FOREIGN PATENT DOCUMENTS

EP    184188 A2    12/1985

(Continued)

OTHER PUBLICATIONS

Sep. 15, 2006 Communication and European Search Report.

(Continued)

*Primary Examiner*—Martin J Angebranndt
(74) *Attorney, Agent, or Firm*—Cooper & Dunham LLP

(57) ABSTRACT

A phase change optical recording medium includes at least a supporting substrate and a recording layer essentially consisting of AgInSbTe alloy compositions implementing recording and readout steps utilizing changes in reflectivity. The recording medium is characterized by the relation $v_0 \geq 0.7\ v_{WH}$, where the critical relative velocity of phase change, $v_0$, defined by the value of v, at which the differential coefficient, $-dR_{(v)}/dv$, reaches a maximum, when the recording medium moves against an optical unit during the recording steps at a relative velocity, v, ranging from minimum and maximum relative velocities warranted for the recording medium, $v_{WL}$ and $v_{WH}$, respectively. When the reflectivity is measured with varying erase power $P_E$ at the linear relative scanning velocity $v_0$, the reflectivity of the recording layer as a function of erase power, $R(P_E)$, preferably has a minimum. The recording layer has an activation energy of deterioration equal to or greater than 1.6 eV, which is obtained by measuring asymmetry, A, and calculating according to the equations, k=dt/dA, and $k=k_0 \times \exp(E_a/k_B T)$. The recording medium is also characterized by activation energy of displacement of the boundary, ranging from 1.0 eV to 2.4 eV, which is obtained from the rate of decrease in the area, S, of the amorphous regions as recorded marks with time according to Arrhenius' equation.

5 Claims, 24 Drawing Sheets

U.S. PATENT DOCUMENTS

| | | | |
|---|---|---|---|
| 5,298,305 A * | 3/1994 | Shinozuka et al. | 428/64.6 |
| 5,637,371 A | 6/1997 | Tominaga et al. | |
| 5,785,828 A | 7/1998 | Yamada et al. | |
| 5,882,493 A * | 3/1999 | Iwasaki et al. | 204/298.13 |
| 6,638,594 B1 * | 10/2003 | Zhou | 428/64.4 |
| 6,884,487 B2 * | 4/2005 | Ito et al. | 428/64.1 |
| 2001/0019523 A1 | 9/2001 | Nakamura | |
| 2002/0018869 A1 | 2/2002 | Abiko et al. | |
| 2002/0110063 A1 * | 8/2002 | Yamada et al. | 369/47.39 |
| 2003/0008235 A1 | 1/2003 | Inoue et al. | |
| 2003/0043712 A1 * | 3/2003 | Nakamura et al. | 369/47.53 |

FOREIGN PATENT DOCUMENTS

| | | | |
|---|---|---|---|
| EP | 0735158 A2 | | 10/1996 |
| EP | 0898272 A2 | | 2/1999 |
| EP | 1047056 | * | 10/2000 |
| EP | 1058249 | * | 12/2000 |
| EP | 1130583 A1 | | 9/2001 |
| EP | 1148485 A2 | | 10/2001 |
| EP | 1158506 A1 | | 11/2001 |
| EP | 0717404 B1 | | 3/2002 |
| EP | 1030292 B1 | | 11/2004 |
| JP | 05-089511 | | 4/1993 |
| JP | 07-147025 | | 6/1995 |
| JP | 08-224961 | * | 9/1996 |
| JP | 8224961 | | 9/1996 |
| JP | 8226871 | | 9/1996 |
| JP | 08-263871 | * | 10/1996 |
| JP | 8263871 | | 10/1996 |
| JP | 9073666 | | 3/1997 |
| JP | 9138947 | | 5/1997 |
| JP | 9219021 | | 8/1997 |
| JP | 09-248965 | * | 9/1997 |
| JP | 9248965 | | 9/1997 |
| JP | 10-255268 | | 9/1998 |
| JP | 10312582 | | 11/1998 |
| JP | 11-070737 | | 3/1999 |
| JP | 11-115313 | * | 4/1999 |
| JP | 11115313 | | 4/1999 |
| JP | 11-296620 | * | 5/1999 |
| JP | 11129620 | | 5/1999 |
| JP | 2000-103168 | | 4/2000 |
| JP | 2000-118135 | * | 4/2000 |
| JP | 2000-348378 | | 12/2000 |
| JP | 2001-283462 | * | 10/2001 |
| WO | WO01/13370 A1 | | 2/2001 |

OTHER PUBLICATIONS

Suzuki, Masaru, et al., Stability of Phase-change Optical Disks Produced by a Pass-through Type Sputtering System, SPIE vol. 2338, Optical Data Storage (1994) pp. 211-219.

Japanese Patent Office, communication dated Apr. 17, 2007 (dispatch No. 178920), in Japanese patent application No. 2001-067689.

Japanese Patent Office, communication dated Apr. 17, 2007 (dispatch No. 179655), in Japanese patent application No. 2001-083650.

* cited by examiner

OPTICAL INFORMATION RECORDING MEDIUM

BACKGROUND

1. Field

This patent specification relates in general to an optical recording medium, and more particularly to a phase change recording medium and the methods, optimally feasible for implementing read/write/erase operations at high recording velocities and attaining desirable overwrite characteristics and storage durability, among others.

2. Discussion of Background

Optical information recording media have recently come into use as viable information data storage and archival devices of large capacity. Of the optical recording media, rewritable optical discs have been in wide use in the area of computers, in general, and various home electronics instruments, as exemplified by CD-RW (compact disc-rewritable), PD (power disk), DVD(digital versatile disc)-RAM, DVD-RW and DVD+RW.

With such a trend of versatile use of rewritable recording media, it is a pressing need for the recording media to acquire high speed recording capabilities, among others, and this is especially true with rewritable CD-RW discs.

As to the high speed recording capabilities, an optical recording medium and a recording method therefor are discussed in Japanese Laid-Open Patent Application No. 11-115313. Although the recording medium is described therein using the parameters similar to those used in the present disclosure, the range of parameter change is different and the former is restricted to rather low recording velocities.

By extending the capabilities for CD-RW discs described in Orange Book (Part III, Vol. 2, Version 2.0), a recording medium is specified to have a specified upper limit of recrystallization linear velocity to meet recording velocities up to CD 8× speed (9.6 m/sec of relative speed). The recording medium described in the above disclosure, however, is considered to have difficulties such as deterioration in signal qualities after recording cycles especially at recording velocities of 9.6 m/sec or larger.

Similarly, another CD-RW recording medium is also specified, also in the Orange Book (Part III, Vol. 2, Version 2.0) to meet multi-speed recording, having a specified upper limit of recrystallization linear velocity. For the recording medium described in the above disclosure, however, no discussion is found with respect to recording at velocities 4.8 m/sec or larger.

As indicated earlier, phase change optical recording media typically exemplified by CD-RW and DVD-RW discs, have come into wide use because of rewritable capabilities, among their various advantages. However, these media have also drawbacks at present such as difficulties in recording, repeated recording (overwrite) and erasure, at various linear recording velocities (multi-speed).

As the demands from the market increase together with the improvements in disc drive capabilities, it becomes increasingly important to provide optical recording medium feasible for multi-speed operations. The media capabilities so far achieved are multi-speed operations of CD-RW discs at linear recording velocities ranging 1.2 m/sec to 4.8 m/sec. Therefore, it is highly desirable for the recording medium to achieve recording at higher linear velocities, and to meet another recent trend of higher density recording.

As to a further advantage of the rewritable recording media, direct overwrite capabilities can be cited, in which repeated read/write operations can be carried out without erase process step.

Because of exclusion of this erase step, however, signal qualities after overwrite steps tend to be affected considerably by the media properties prior to recording. Since this effect is particularly evident for the signal qualities after the first overwrite step, the improvement thereof is of primary importance. In addition, since recording steps proceed as thermal process, there gives rise to drawbacks such as deteriorating change after repeated recording cycles in materials property in the recording layer, to thereby worsen signal qualities.

The above noted trend of signal deterioration in recording media becomes more pronounced at higher recording velocities. When the composition of recording materials is selected so as to be suitable to alleviate the deterioration, storage durability has been found considerably deteriorated for the media.

Therefore, no rewritable optical recording media has been formed so far, having media properties that fulfill both requirements simultaneously, one being direct overwrite recording at high velocities and the other satisfactory storage durability.

In Japanese Laid-Open Patent Application No. 8-224961, for example, an optical recording medium is discussed including at least a recording layer of AgSbTe alloys, having an activation energy of crystallization of 3.0 eV or larger, and dielectric layers formed on both sides of the recording layer. Although improvements in storage life of the recording medium are indicated in that disclosure, satisfactory recording capabilities at higher velocities have not been achieved.

It may be noted herein the activation energy in this disclosure corresponds to that of the transformation from amorphous recorded marks to crystalline portions. The activation energy, however, was obtained for a recording layer, not incorporated into the recording medium, but formed between dielectric layers. This may gives rise an activation energy different from that in real recording layer configurations, as described herein below.

Similarly, in Japanese Laid-Open Patent Application No. 8-263871, another optical recording medium is discussed including a recording layer of AgInSbTe alloys with a specified composition, having an activation energy of 1.0 eV or larger. Although improvements in storage life of the recording medium are described in that disclosure, high speed recording has not been achieved.

It may be noted herein the above activation energy corresponds to that of the transformation from amorphous recorded marks to crystalline portions, which has been obtained for a recording layer incorporated into the recording medium, in which the activation energy value is clearly different from the value, 3.0 eV or more, disclosed in the above mentioned application '961.

According to Japanese Laid-Open Patent Application No. 9-248965, a further recording medium includes a recording layer having an activation energy (amorphous marks to crystalline transformation) of 3.5 eV or more. Although improvements in overwrite characteristics are indicated in that disclosure, its storage durability is not completely satisfactory.

In addition, in Japanese Laid-Open Patent Application No. 11-129620, a recording medium includes a recording layer of AgInSbTe alloys having specified values of composition and crystallization temperature, in which improvements are indicated in its feasibility of satisfactory signal qualities, and high recording reliability achieved by an activation energy (amorphous marks to crystalline transformation) of 1.5 eV or larger.

However, satisfactory signal qualities after repeated overwrite cycles are not always attained, in practice, and sufficient storage durability has not been attained either.

In this context, it may be noted herein below that recording capabilities at higher velocities are closely related to the crystalline state of the recording layer. For example, although recording materials, which tend to crystallize with more ease even at higher recording velocities, are preferably selected to achieve high recording speeds, these recording materials, in general, have low crystallization energies in recording layer.

For the low crystallization energy, the capabilities of recording, repeated recording (overwrite) and erasing at high recording speeds are generally improved, while storage durability decreases.

Storage life can be obtained from an activation energy for a single recording layer according to the method in the Application '961. Although the activation energy of transition from amorphous marks to crystalline portions may be obtained for a single, isolated recording layer by that method, an actual activation energy is considered different, in general, since the recording layer is actually placed in recording medium environment.

Accordingly, it is desirable to obtain more realistic energy value for a recording layer incorporated into the media, as in Japanese Laid-Open Patent Application No. 8-263871. The method in this application '871, however, is considered still insufficient for the accurate calculation of the energy because of its narrow range in consideration and insufficient number of actual deterioration (or failure) modes. In addition, the calculation for higher recording velocities is not feasible by this method.

Although several improvements have been made as mentioned herein above, there are several points yet to be improved with regard to satisfactory recording capabilities at higher velocities, signal qualities after repeated overwrite steps and storage durability. In addition, it is also desirable for the recording medium to meet another recent trend of higher density recording.

These may be achieved by further pursuing and optimizing the components of recording media in terms of recording materials, layer construction, together with their optical and thermal properties, among others.

SUMMARY

Accordingly, it is an object of the present disclosure to provide an optical information recording medium and a method for optimally feasible for implementing read/write/erase operations at high recording velocities and attaining desirable overwrite characteristics and storage durability, having most, if not all, of the advantages and features of similar employed optical recording media and methods, while eliminating many of the aforementioned disadvantages.

The following brief description is a synopsis of only selected features and attributes of the present disclosure. A more complete description thereof is found below in the section entitled "Description of Preferred Embodiments".

The phase-change optical recording medium disclosed herein is devised to be capable of implementing at least recording and readout steps on information data by electromagnetic radiation, utilizing the change in reflectivity of the recording medium during readout steps. The recording medium displaces against an optical unit during the recording steps at a relative velocity, v, ranging from minimum and maximum relative velocities warranted for the recording medium, $v_{WL}$ and $v_{WH}$, respectively, in which, when the optical unit is operated under conditions of record/readout wavelength of 785 nm and numerical aperture of 0.49, a critical relative velocity of phase change, $v_0$, which is defined by the value of v, at which the differential coefficient, $-dR_{(v)}/dv$, reaches a maximum, satisfy a relation $$v_0 \geq 0.7 \, v_{WH},$$

where reflectivity, R, of the recording medium is measured by the optical unit during a DC mode irradiation of electromagnetic radiation at a power of $P_E = 0.75 \, P_{OH}$ and at the relative velocity, $v_{WH}$, with $P_{OH}$ being an optimum recording power at the maximum relative velocity $V_{WH}$, and where the reflectivity, R, changes with v from one saturated value at low v region, $R_A$, to another saturated value at high v region, $R_B$.

In addition, the phase change optical recording medium is characterized by (1) the critical relative velocity of phase change, $v_0$, preferably satisfying the relation, $v_0 \leq 0.3 \, v_{WL}$, (2) a margin of critical velocity for phase change, $\Delta v_0$, which is defined by the half width of $-dR_{(v)}/dv$ versus v curve, satisfying the relation, $\Delta v_0/v_0 < 0.4$, (3) reflectivity values $R_A'$ and $R_B'$, which are obtained during readout steps, satisfying the relation, $0.1 < R_A'/R_B' < 0.6$, where $R_A'$ and $R_B'$ are saturated values of the reflectivity, R', obtained during readout steps, at high v and low v regions, respectively, (4) the maximum and minimum relative velocities, $v_{WH}$ and $v_{WH}$, satisfying the relation, $v_{WL}/v_{WL} \geq 2.5$, and (5) a recording material included in the recording medium consisting of Ag, In, Sb and Te, with a proportion in atomic percent of α(Ag): β(In): γ(Sb): δ(Te), with $$0.1 \leq \alpha \leq 3.0,$$

$$5.0 \leq \beta \leq 12.0,$$

$$60.0 \leq \gamma \leq 72.0, \text{ and}$$

$$22.0 \leq \delta \leq 30.0.$$

According to another aspect, the phase change optical recording medium disclosed herein includes at least a supporting substrate, and at least one recording layer including at least a phase change recording material.

The recording medium is devised to be capable of implementing at least recording and readout steps on information data by way of phase transition induced in the recording layer by irradiating a focused light beam, in which reflectivity of the recording layer as a function of erase power, $R(P_E)$, has a minimum, when the reflectivity is measured after the DC mode erasure which is carried out with varying erase power $P_E$ at a linear relative scanning velocity $v_0$ using an optical pickup operable under the conditions of an emission wavelength of 780 nm and a numerical aperture of 0.50, where $v_0$ indicates an optimum linear relative scanning velocity v of the optical pickup against recording medium.

In addition, the phase change optical recording medium is characterized by (1) the ratio, $R_1(P_{E0})/R(P_{E0})$, where the function, $R_1(P_E)$, is defined as the straight line asymptotic to the function $R(P_E)$, and the optimum irradiation power $P_{E0}$ is defined as $P_0$ at which a minimum of $R(P_E)$ versus $P_E$ curve is found, (2) the relations in terms of the ratio, $R_1(P_{E0})/R(P_{E0})$, such as $R_1(P_{E0})/R(P_{E0}) < 1.4$ and $R_1(P_{E0})/R(P_{E0}) > 1.05$, (3) the relations in terms of the slope, $\{dR_1(P_E)/dP_E\}$, such as $\{dR_1(P_E)/dP_E\} > 0.001\%/mW$ and $\{dR_1(P_E)/dP_E\} < 0.5\%/mW$, (4) the optimum scanning velocity $v_0$ ranging from 9 m/sec and 20 m/sec during recording steps using the multipulse mark-edge recording method, and (5) the recording layer essentially consisting of Ag, In, Sb and Te, with a proportion in atomic percent of α(Ag): β(In): γ(Sb): δ(Te), with $0.1 \leq \alpha \leq 7.0$, $2.0 \leq \beta \leq 10.0$, $64.0 \leq \gamma \leq 92.0$, and $5.0 \leq \delta \leq 26.0$.

According to still another aspect, the phase change optical recording medium disclosed herein includes at least a supporting substrate and contiguous layers formed on the supporting substrate in order as follows, a lower dielectric layer, a recording layer, an upper dielectric layer, a reflective layer, and an overcoat layer.

The recording medium is devised such that the recording layer in the recording medium has an activation energy of deterioration of equal to, or larger than 1.6 eV, in which the activation energy is obtained by first measuring asymmetry, A, by an optical pickup operable under conditions of an emission wavelength of 790 nm and a numerical aperture of 0.50, calculating a parameter, k, specified by a relation, k=dt/dA, with t being storage time, and further calculating according to an equation, $k=k_0 \times \exp(E_a/k_B T)$, with $k_B$ being Boltzmann's constant and T being storage temperature in degree in Kelvin.

In addition, the phase change optical recording medium is characterized by (1) the activation energy is equal to, or smaller than 3.0 eV, and (2) the recording layer consisting of Ag or Ge, In, Sb and Te, with a proportion in atomic percent of $\alpha$(Ag or Ge): $\beta$(In): $\gamma$(Sb): $\delta$(Te), with $0.1 \leq \alpha \leq 7.0$, $2.0 \leq \beta \leq 10.0$, $64.0 \leq \gamma \leq 92.0$, and $5.0 \leq \delta \leq 26.0$, provided that $\alpha+\beta+\gamma+\delta \geq 97$.

According to another aspect, the phase change optical recording medium disclosed herein includes at least a supporting substrate, at least one recording layer formed on the supporting substrate, including at least a phase change recording material, as a major component; and a reflective layer formed over the recording layer.

The recording medium is capable of optically implementing at least recording, readout, and erase steps on information data by forming amorphous regions to be recorded marks, and by transforming the amorphous regions into crystalline regions to be erased portions of the recorded marks, in the recording layer, by way of recording according to the mark length modulation recording method, in which the crystallization of the amorphous regions as recorded marks is proceeded by the displacement of the boundary between the amorphous regions and crystalline regions.

In addition, the phase change optical recording medium is characterized by (1) the activation energy of displacement of the boundary of less than 2.4 eV, which is obtained by approximating the rate of decrease in the area, S, of the amorphous regions per unit time using Arrhenius' relation, $-dS/dt \propto \exp(-E_a/k_B T)$, where $k_B$ is Boltzmann's constant and T is temperature in degree in Kelvin, (2) the activation energy of displacement of the boundary of greater than 1.0 eV, and (3) the recording layer consisting of Ag, In, Sb and Te, with a proportion in atomic percent of $\alpha$(Ag): $\beta$(In): $\gamma$(Sb): $\delta$(Te), with $0.1 \leq \alpha \leq 7.0$, $2.0 \leq \beta \leq 10.0$, $64.0 \leq \gamma \leq 92.0$, and $5.0 \leq \delta \leq 26.0$, provided that $\alpha+\beta+\gamma+\delta \geq 97$, or alternatively, (4) the recording layer consisting of Ge, In, Sb and Te, with a proportion in atomic percent of $\epsilon$(Ge): $\beta$(In): $\gamma$(Sb): $\delta$(Te), with $0.1 \leq \epsilon \leq 7.0$, $2.0 \leq \beta \leq 10.0$, $64.0 \leq \gamma \leq 92.0$, and $5.0 \leq \delta \leq 26.0$, provided that $\epsilon+\beta+\gamma+\delta \geq 97$.

According to another aspect, the method disclosed herein for characterizing a phase change optical recording medium including at least a recording layer, in which the recording medium is capable of implementing recording and readout steps on information data, utilizing the change in reflectivity, R=R (v), of the recording medium during the readout steps, includes the steps of (1) displacing the recording medium against an optical unit at a relative velocity, v, ranging from minimum and maximum relative velocities warranted for the recording medium, $v_{WL}$ and $v_{WH}$, respectively, (2) operating the optical unit under conditions of record/readout wavelength of 789 nm and numerical aperture of 0.49, (3) obtaining a critical relative velocity of phase change, $v_0$, which is defined by the value of v, at which the differential coefficient, $-dR_{(v)}/dv$, reaches a maximum, and (4) finding whether the relation, $v_0 \geq 0.7 \, v_{WH}$, is satisfied.

According to another aspect, the method disclosed herein for characterizing a phase change optical recording medium including at least a supporting substrate, and at least one recording layer including at least a phase change recording material, in which the recording medium is capable of implementing at least recording and readout steps on information data by way of phase transition induced in the recording layer by irradiating a focused light beam, includes the steps of (1) carrying out erasing steps onto the recording medium in the DC mode laser beam irradiation with varying erase power $P_E$ at the linear relative scanning velocity $v_0$ using an optical pickup operable under conditions of an emission wavelength of 780 nm and a numerical aperture of 0.50, (2) measuring reflectivity, $R(P_E)$, as a function of erase power, $P_E$, and (3) finding whether the reflectivity versus erase power relation has a minimum.

According to another aspect, the method disclosed herein for characterizing a phase change optical recording medium including at least a supporting substrate and contiguous layers formed on the supporting substrate in order as follows, a lower dielectric layer, a recording layer, an upper dielectric layer, a reflective layer, and an overcoat layer, includes the steps of (1) measuring asymmetry, A, by an optical pickup operable under conditions of an emission wavelength of 790 nm and a numerical aperture of 0.50, (2) calculating a parameter, k, specified by the relation, k=dt/dA, with t being storage time, (3) calculating an activation energy of deterioration, $E_a$, according to an equation, $k=k_0 \times \exp(E_a/k_B T)$, with $k_B$ being Boltzmann's constant and T being storage temperature in degree in Kelvin, and (4) finding whether the activation energy of deterioration, $E_a$, is equal to, or larger than 1.6 eV.

According to another aspect, the method disclosed herein for characterizing a phase change optical recording including at least a supporting substrate, at least one recording layer formed on the supporting substrate, including at least a phase change recording material, and a reflective layer formed over the recording layer, in which the recording is capable of optically carrying out at least recording, readout, and erase steps on information data by forming amorphous regions to be recorded marks, and by transforming the amorphous regions into crystalline regions to be erased portions of the recorded marks, in the at least one recording layer, by way of recording steps according to the mark length modulation recording method, and the crystallization of the amorphous regions as recorded marks being proceeded by the displacement of boundary between the amorphous regions and crystalline regions, includes the steps of (1) obtaining the rate of decrease in the area, S, per unit time, of the amorphous regions per unit time, (2) approximating the rate using Arrhenius' relation, $-dS/dt \propto \exp(-E_a/k_BT)$, with $k_B$ being Boltzmann's constant and T being temperature in degree in Kelvin, (3) finding the activation energy, and (4) deciding whether the activation energy of displacement of the boundary is less than 2.4 eV.

The present disclosure and features and advantages thereof will be more readily apparent from the following detailed description and appended claims when taken with drawings.

DESCRIPTION OF PREFERRED EMBODIMENTS

In the detailed description which follows, specific embodiments on a phase change recording medium and the methods for optimally feasible for implementing read/ write/ erase operations at high velocities and attaining desirable overwrite characteristics and storage durability are described. It is understood, however, the present disclosure is not limited to these embodiments, and it is appreciated that the materials and methods for optical recording media disclosed herein may also be adaptable to any form of information recording. Other embodiments will be apparent to those skilled in the art upon reading the following description.

Figure 1:
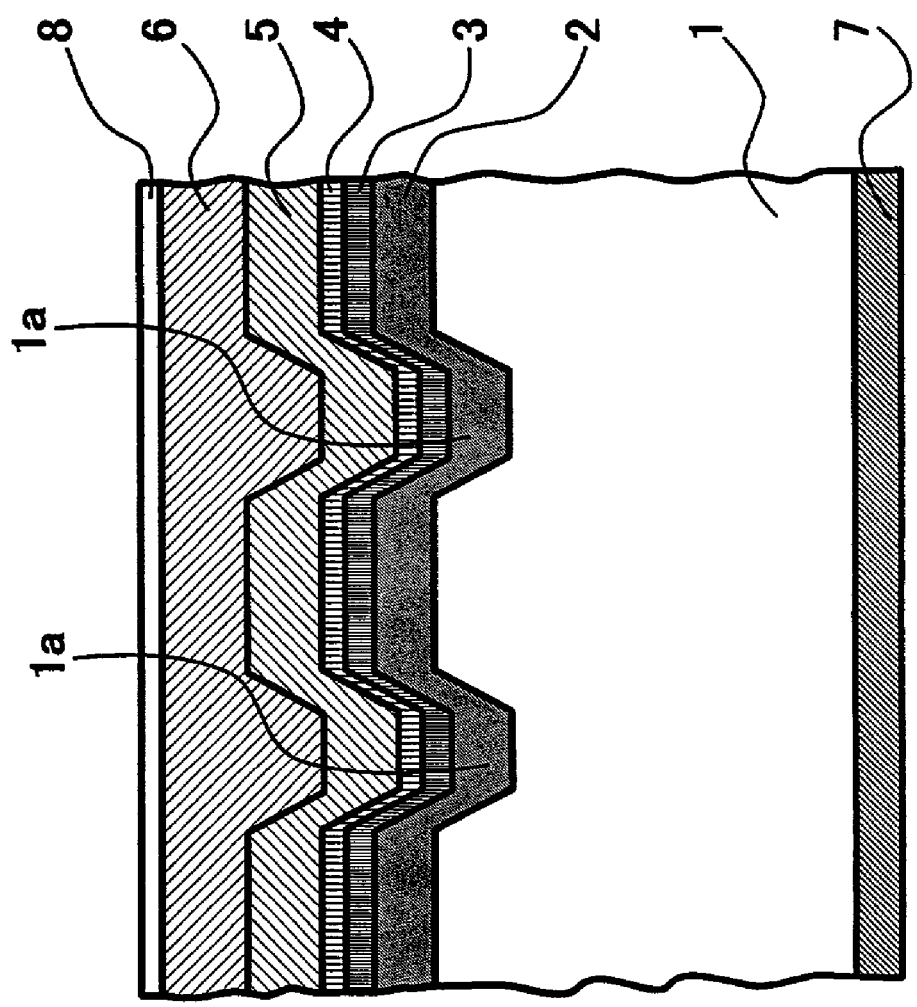
FIG. 1 is a section view illustrating the optical information recording medium according to one embodiment disclosed herein.

The optical information recording medium disclosed herein is primarily related to a phase change optical information recording medium which has a layer construction typically illustrated in FIG. 1.

Referring again to FIG. 1, the recording medium includes at least a transparent supporting substrate 1 and the following layers formed contiguously thereon in order as follows: A lower dielectric layer 2, a recording layer 3, an upper dielectric layer 4, and a reflective/heat dissipating layer 5.

In addition, an overcoat layer 6 and a hard coat layer 7 may be formed on the reflective layer 5 and on the lower face of the substrate 1, respectively. Furthermore, a printed layer 8 may additionally be provided on the overcoat layer 6, where relevant.

The substrate 1 is provided primarily to support the recording medium as a whole and formed of materials preferably enough transparent to light incident thereto in the wavelength range for use in recording and readout operations of the recording medium.

Suitable materials for forming the substrate 1 include glass, ceramics and resinous materials. Of these materials, resins are preferably employed for its satisfactory transparency and moldability.

Specific examples of the resins include polycarbonate resins, acrylic resins, epoxy resins, polystyrene resins, acrylonitrile-styrene copolymeric resins, polyethylene resins, polypropylene resins, silicone resins, fluororesins, acrylonitrile-butadiene-styrene (ABS) resins and urethane resins. Among these resins, polycarbonate resins and acrylic resins are preferably used for their excellent moldability, optical properties and relatively low costs.

In addition, as shown in FIG. 1, the substrate 1 may be provided with guide tracks 1a to help control the position of light pickup prior to information recording as well as during the read/write operations. The guide tracks 1a are formed having a pitch, width, and depth, which are specifically optimized depending on the parameters for record/readout light pickup and the density of information to be recorded in the recording medium.

Furthermore, guide tracks 1a are additionally provided with address information, which is prefabricated by recording either frequency modulated information in a wobbling (or meandering) manner or pre-pit data pertaining the information data.

The lower dielectric layer 2 and upper dielectric layer 4 are formed primarily consisting of dielectric materials for their suitable thermal and optical properties.

Examples of suitable dielectric materials for forming the dielectric layers include metal oxides such as SiO, $SiO_2$, ZnO, $SnO_2$, $TiO_2$, $In_2O_3$, MgO and $ZrO_2$; nitrides such as $Si_3N_4$, AlN, TiN, BN and ZrN; sulfides such as ZnS, $In_2S_3$ and $TaS_4$; carbides such as SiC, TaC, $B_4C$, WC, TiC and ZrC; diamond-like carbon, and mixtures thereof.

These materials may be used individually or in combination. In addition, they may further include impurities, where relevant.

The lower and upper dielectric layers 2, 4 can be formed by, for example, vacuum evaporation, sputtering, ion plating, and CVD methods. Of these, the sputtering method is preferably utilized for its excellent productivity and properties of those layers formed.

The materials and thickness for forming respective dielectric layers may be determined independent one another considering optical and thermal properties. The lower dielectric layer 2 preferably have a thickness ranging from 10 nm to 5000 nm.

The recording layer 3 is formed of phase change materials. Examples of the phase change materials suitable for optical information recording preferably include alloys such as GeTe, GeTeSe, GeTeS, GeSeSb, GeAsSe, InTe, SeTe, SeAs, Ge—Te—(Sn, Au, Pd), GeTeSeSb, GeTeSb, and AgInSbTe. The composition of these phase change materials is optimized considering optical and thermal properties.

As to optical properties, there preferably selected are the materials which are exhibit a large difference in optical properties between crystalline (i.e., stable state) and amorphous (metastable state) regions at the wavelength for disc readout, for their capabilities of yielding readout signals with high C/N ratios.

As to thermal properties, these materials together with layer structure are preferably optimized such that the transition between crystalline and amorphous states is achieved with relative ease by means of light beams of presently operable intensities and recording velocities, to thereby attain excellent overwrite characteristics.

It may be noted herein that by 'amorphous region' in the present disclosure is meant that the region is primarily formed of amorphous portions and may include a few minute crystalline regions, as long as the region exhibits substantially the same optical characteristics as those of completely amorphous region.

Among the alloys above mentioned, the recording materials in the present disclosure primarily consists of the AgInSbTe compound.

The composition of the AgInSbTe compound is optimized considering linear recording velocities, among others. For fulfilling activation energy requirement, which is detailed herein below, and for implementing excellent recording capabilities at high recording velocities, the composition of the alloy is preferably selected as follows.

Namely, the recording layer essentially consists of Ag or Ge, In, Sb and Te, with a proportion in atomic percent of $\alpha$(Ag or Ge): $\beta$(In): $\gamma$(Sb): $\delta$(Te), with $0.1 \leq \alpha \leq 7.0$, $2.0 \leq \beta \leq 10.0$, $64.0 \leq \gamma \leq 92.0$, and $5.0 \leq \delta \leq 26.0$, provided that $\alpha+\beta+\gamma+\delta = \geq 97$.

The AgInSbTe compound has been found to have excellent recording characteristics for implementing recording utilizing the mark-edge recording method because of the formation of clear boundary between stable (crystalline) and metastable (amorphous) phases during recording steps, also for yielding a wide margin of linear recording velocities by additionally including a minute amount of N elements.

In addition, additional elements or impurities may be incorporated into the above-mentioned recording materials to further improve media characteristics. For example, these additional elements are preferably selected from the group consisting of B, N, C, O, Si, Ga, Ge, S, Se, Al, Ti, V, Mn, Fe, Co, Ni, Cu, Zn, Sn, Pd, Pt and Au. The additional element(s) are generally added to make fine adjustments of the optical and thermal properties. It may be added that the above impurities are selected from those which are not already included as major components in respective recording materials.

The recording layer may be formed by, for example, vacuum evaporation, sputtering, ion plating, CVD, or other similar methods. Of these methods, the sputtering method is preferably utilized for its excellent productivity and low costs.

Subsequently, the reflective/heat dissipating layer 5 is formed on top of the upper dielectric layer 4.

Suitable materials for forming the reflective layer 5 include metals such as Ag, Au and Al, and the alloys thereof added with at least one element selected from the group consisting of Ti, Si, Cr, Ta, Cu, Pd and C. After considering optical and thermal properties, and productivity, the materials may suitably be selected from Al or Ag alloys, or Ag metal.

Since the composition of the alloys and the thickness of the reflective/heat dissipating layer 5 may arbitrary be selected, it is preferable for these parameters be optimized considering optical and thermal properties thereof.

Furthermore, the overcoat layer 6 is preferably formed on top of the reflective layer 5 to serve as an oxidation resistant layer. This layer is generally formed with light curing or electron beam hardening resinous materials. Of these light curing materials, ultraviolet curing materials are generally used for its relative ease in forming films and hardening.

The film formation thereof is carried out by dipping or spin coating method, for example. Of these methods, the spin coating method is preferably utilized for its uniformity of finished films and high production yield.

The hard coat layer 7 may additionally be formed on the mirror face of the substrate, to help protect the face, through which read/write laser beams are transmitted, to thereby assure the reliability of the read/write process steps.

Examples of the materials used for forming the hard coat layer 7 includes those noted earlier for forming the overcoat layer 6. Since defects generated in the hard coat layer 7 is considered to have a strong influence on the reliability of the record/readout steps, the materials for forming the layer preferably has excellent properties to be coated in uniform thickness with relative ease over pertinent area. In addition, the hard coat layer thus formed on the mirror face of the substrate may also serve to increase surface strength against scratches.

For obtaining desirable concentration of the materials, solvents and leveling agents may suitably used for diluting the materials. Furthermore, an antistatic composition may be added into the hardcoat layer, where relevant, to render antistatic and thus prevent dirt from sticking onto the layer surface.

On the overcoat layer 6, at least one of printed layers 7 may be formed, thereby serving as a label. Examples of the material for use in the printed layer 7 may be selected from the group of conventional light curing inks which are printed generally by the screen printing method. Alternatively, at least one of resin layer may additionally be formed on the overcoat layer 6, to serve as a protective layer or to help further improve disc appearance. This layer is generally formed with light curing or electron beam hardening resinous materials by forming a film thereof by dipping or spin coating method, and subsequently hardening. During film formation, inorganic fillers may be added further to improve disc strength, and coloring agents such as dyes and pigments may also be added to help improve the appearance.

Furthermore, a couple of recording media may be adhered with two overcoat layers, which may be covered by the above-mentioned resin layer, back to back so as to form a single recording disc with either single or double-sided recording disc surface.

Since the thus formed recording material is in the amorphous (metastable) state immediately after formation, the material has to be subjected to so called initialization process, in which the layer is brought to a crystallized state by laser annealing process steps to yield a high enough reflectivity and signal C/N ratios suitable for record/readout operations. The process of the initialization has a considerable effect on the resultant recording characteristics such as overwrite capability of optical recording media.

The initialization process steps can generally be carried out by either irradiating a focused laser beam while scanning, or flashing an intense energetic beam over the entire disc area. Of these methods, the former with a high power semiconductor laser device is preferred for its productivity and resultant disc properties, as disclosed in Japanese Laid-Open Patent Applications No. 9-73666 and 10-312582.

Among the conditions for the disc initialization, power of laser irradiation and linear velocity of beam scanning vary depending on the kind of the recording material and the layer construction of the recording medium. These conditions are preferably optimized considering overwrite characteristics and others, as follows.

Namely, the energy density E is expressed by the relation, $$E = I \cdot U/(S \cdot Wt) = P/(Wr \cdot U),$$

where I is output laser power, U linear scanning speed, S the area on the medium under irradiation, and Wt and Wr the width of the laser beam in the direction along, and perpendicular to, the scanning direction, respectively.

The energy density value expresses the amount of energy input into the unit area of the recording medium during beam scanning, and this value is therefore directly related to the effect generated on the recording layer by the initialization process.

As the energy density E increases, the amount of heat generated in the medium increases, thereby causing the increase in temperature in the recording layer. As a result, the recording layer can be brought into stable crystalline state.

However, the energy density E of unduly high causes the following difficulties: When amorphous marks are formed on the thus formed crystalline recording layer by further irradiation, edge portions of the marks become crystallized more highly by the heat from the above-mentioned irradiation. As a result, when lands are subsequently overwritten on top of the recorded marks, these marks become so stabilized that they can not be completely erased, to thereby result in the deterioration in jitters during the first overwrite step.

The upper limit of the energy density E max, which assures satisfactory first overwrite characteristics, is thus obtained as $$E\ max = 1000\ J/m^2.$$

The scanning speed, U, has a large effect on unevenness in reflectivity resulted from the initialization. For unduly high U values, the portions of the recording medium become to be left as non-crystallized (or prematurely crystallized) more often, which is resulted at least partially from the failure in tracking movements by focus servo unit, which is, in turn, caused by the high U values. This difference in crystallization has effects on the reflectivity, as indicated earlier, thereby resulting in spatial fluctuation in reflectivity and further causing possible failure in tracking.

For unduly low U values, in contrast, the beam irradiation time is prolonged and the recording and dielectric layers in the medium tend to be affected more often by heat damages. As a result, the deterioration in recording characteristics such as jitters, in particular, is caused after a large number of overwrite cycles.

Accordingly, it is preferable for the recording medium disclosed herein be initialized at least under the conditions with respect to the scanning speed U of 3.5 m/sec $\leq$ V $\leq$ 6.5 m/sec.

Information recording process steps disclosed herein are carried out with an optical pickup equipped with a semiconductor laser device, laser beams from which are focused and then irradiated onto a recording medium, to thereby induce the reversible phase transition in the recording layer between the amorphous (metastable) and crystalline (stable) states.

The recording can be achieved preferably using a series of laser pulses exposed to the recording medium, i.e., multipulse method, in which the phase transition can be achieved by only modulating the intensity of laser beams. As a result, satisfactory results of disc properties are obtained in record and overwrite process steps, as disclosed in Japanese Laid-Open Patent Applications No. 9-138947 and 9-219021.

Besides the mark edge and mark position methods for modulating the information data, the mark length modulation method is preferably utilized for its excellent capability for high recording densities.

In this context, it may be added that recorded marks are formed as amorphous regions, or metastable regions, which are imbedded in stable, crystalline portions in the recording layer. And, the transition in the recording layer from the metastable state to stable state is generated by either slow cooling from melt, or displacement (or movement) of the amorphous-crystalline boundary below melting point (eutectic temperature). In the recording materials disclosed herein, it is preferable for the transition be due to the latter, the displacement of the boundary.

In the case of the transition with the boundary displacement, the temperature of the recording layer need not be raised higher than the melting temperature. As a result, recorded marks can be erased with relative ease, and heat damages caused in the recording layer can be reduced, to thereby be able to provide optical information recording media having excellent properties such as high reflectivity and modulation ratio, and reduced jitters.

Therefore, it is quite important to find and then control the parameters pertinent to the boundary displacement, such as an activation energy of the displacement, for example, which will be detailed later on.

The thus formed and initialized optical information recording medium is subsequently subjected to various measurements to obtain several characteristics of the medium, such as a critical relative velocity of phase change, reflectivity as a function of erase power, activation energy of deterioration, and activation energy of boundary displacement, among others.

The critical relative velocity of phase change will be detailed herein below.

The critical relative velocity is measured by a recording apparatus equipped with an optical unit operated under the following conditions:

Record/readout wavelength 789 nm, and numerical aperture (NA)=0.49.

The recording steps were carried out at a relative velocity, $V_W$, of the optical unit against a moving (or rotating) recording medium. The maximum and minimum relative velocities are $V_{WH}$ and $V_{WL}$, respectively. Also, the beam power applied to the medium was adjusted to have a magnitude of $P_E = 0.75 P_{OH}$, where $P_{OH}$ is the optimum recording power at the maximum relative velocity $V_{WH}$.

During the measurements, the recording medium was irradiated with a beam power of $P_E$, while either the optical unit or recording medium was moving at a relative velocity v. In addition, the irradiation was made with DC light beams in the DC mode, which was in contrast to the pulse mode usually utilized for the recording. Subsequently, reflectivity values, $R_{(v)}$, of the irradiated disc portions were measured by the recording apparatus, which also served presently as a readout apparatus.

Figure 2:
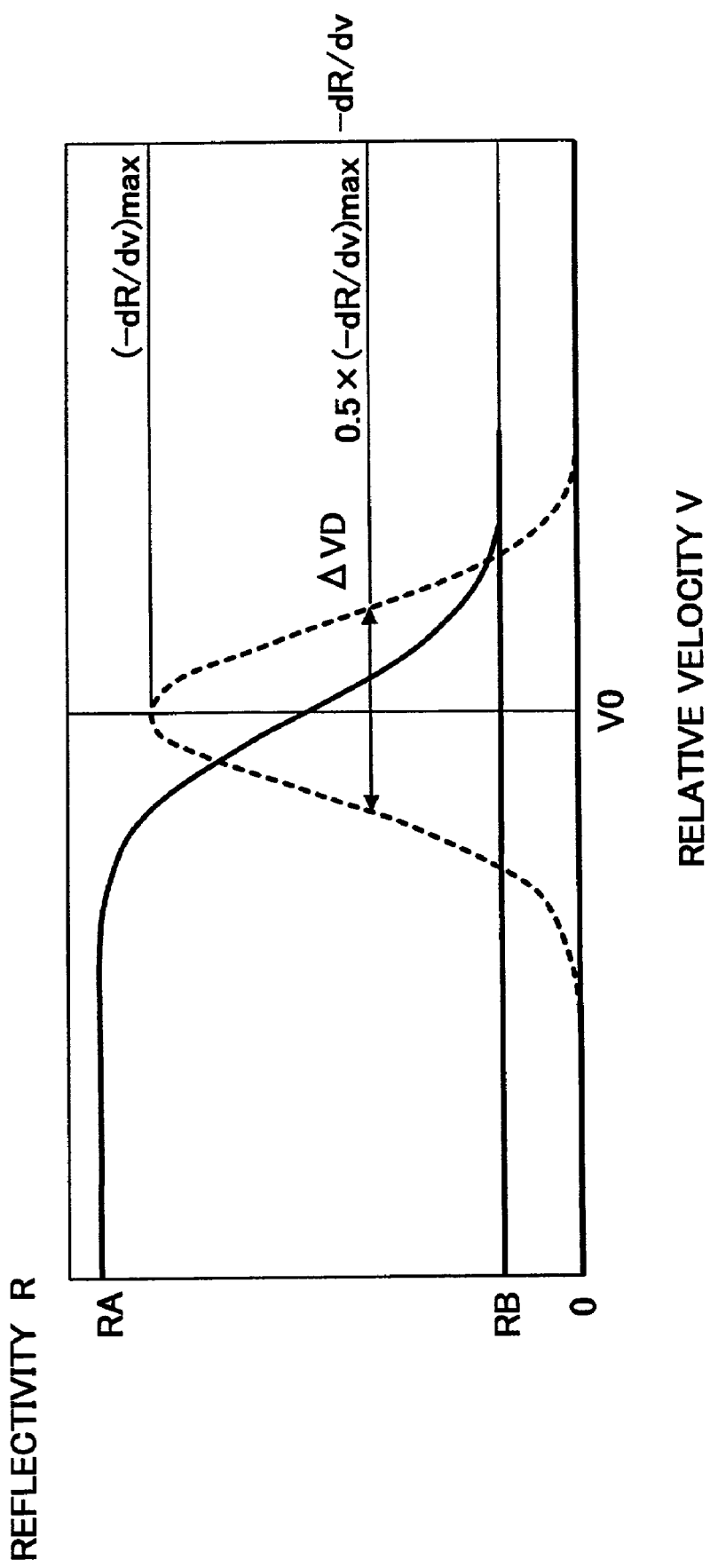
FIG. 2 includes a graphical plot illustrating the change in reflectivity, $R_{(v)}$, and its differential coefficient, $-dR_{(v)}/dv$, with the relative velocity v, obtained with the recording medium according to one embodiment disclosed herein.

The results obtained from the measurements are shown in FIG. 2, which includes a graphical plot illustrating the change in reflectivity, $R_{(v)}$, and its differential coefficient, $-dR_{(v)}/dv$, with the relative velocity v.

As the velocity v increases, R decreases and then saturates at a certain point and beyond. In addition, as v decreases, R increases and then saturates. The R values saturated at the high v and low v regions are expressed by $R_A$ and $R_B$, respectively.

The v value, at which the differential coefficient, $-dR_{(v)}/dv$, reaches its maximum, is defined as critical relative velocity for phase change, $v_0$. In addition, the margin of critical velocity for phase change, $\Delta v_0$, is also defined by the half width of the $-dR_{(v)}/dv$ versus v curve, as also shown in FIG. 2.

The optical information recording medium disclosed herein is devised preferably to satisfy the relation $v_0 \geq 0.7 v_{WH}$, where $v_{WH}$ is the maximum relative recording velocity warranted for the recording medium.

By adjusting for the value $v_0$ be brought into the range specified just above, previously recorded marks can be efficiently erased by erase/rewrite (i.e., overwrite) steps which are carried out at relative velocity of $v_{WH}$ with the recording apparatus. As a result, the optical recording medium can be provided having excellent repeated recording cycle characteristics at the velocity of $v_{WH}$.

In contrast, when the value $v_0$ is adjusted outside of above specified range, the erasure of the recorded marks, or duplicated recording, becomes considerably difficult by erase and overwrite steps which are carried out at $v_{WH}$ relative velocity, thereby resulting the deterioration in overwrite characteristics. That is, the mark (or land) once in the $R_B$ state is difficult to be brought back to the $R_A$ land state.

In addition, with respect to the minimum value of the relative recording velocity, $v_{WL}$, the recording medium is preferably devised to satisfy the relation $v_0 \leq 0.3 v_{WL}$.

By adjusting for the value $v_0$ be brought into the above specified range, recorded marks can be formed at lower beam intensities, to thereby the optical recording medium be provided having excellent overwrite characteristics with high recording sensitivities.

The margin of critical velocity for phase change, $\Delta v_0$, was defined earlier by the half width of the $-dR_{(v)}/dv$ versus v curve. This value of margin corresponds the region, at which the recording medium tends to be suffered from instability of media property with respect to the change in the relative velocity.

When the $\Delta v_0$ value is relatively large, the amplitude of readout signals, which are previously formed at recording relative velocities in the vicinity of $\Delta v_0$, shows large changes with the fluctuation of recording power, thereby resulting in worsened media characteristics. Namely, the qualities of the signals recorded at relative recording velocity $v_{WH}$ tend to be deteriorated.

The $\Delta v_0$ value is therefore preferably be adjusted to satisfy the relation $\Delta v_0 / v_0 < 0.4$.

By adjusting for the $\Delta v_0/v_0$ value be brought into the above specified range, the stability of media property can be improved against the change in relative velocity and recording power for the recording steps carried out at the velocity of $v_{WH}$.

The saturated reflectivity values $R_A$ and $R_B$, which are defined earlier respectively at the high v and low v regions, have a large effect on the contrast of marks (or lands) formed during recording steps. It is preferable for the values $R_A$ and $R_B$ are adjusted to be within the range of $0.1 < R_A/R_B < 0.6$ to obtain readout signals with high contrast.

In addition, it is preferable for the values $v_{WL}$ and $v_{WL}$ be adjusted to satisfy the relation, $v_{WH}/v_{WL} \geq 2.5$, since the recording in the CAV (constant angular velocity) mode becomes feasible on the currently leading CD discs (120 mm in diameter) in the range of disc diameter from 46.5 mm to 116 mm.

In the phase change recording medium disclosed herein, it is preferable for several parameters of the recording layer be optimized considering optical and thermal properties of the recording medium together with the layer structure of the medium.

This is requisite especially to attain satisfactory qualities of the recording medium suitable for high speed and high density recording, which may be achieved by adjusting the optical and thermal properties within a certain, predetermined range for the recording layer. To this end, the change in the reflectivity with erase power $P_E$ will be considered in detail herein below as one of the properties to be properly adjusted.

An optical pickup housed in the recording layer measurement apparatus is used under the following conditions:

NA=0.50,

λ=780 nm, circularly or elliptically polarized, and a scanning linear velocity v.

An optical pickup in use for conventional CD-R/RW drive may suitably be utilized here, when the pickup is provided with a laser diode having a laser beam power suitable for measuring media parameters such as, for example, light reflectivity which is obtained by monitoring returning beams upon reflection from the medium.

It is also necessary for the beam power ($P_R$) be adjusted in the range suitable for achieving focusing and tracking of the recording medium, still without causing appreciable effects on the recording layer. The beam power, therefore, preferably ranges from 0.5 mW to 4.0 mW.

Figure 3:
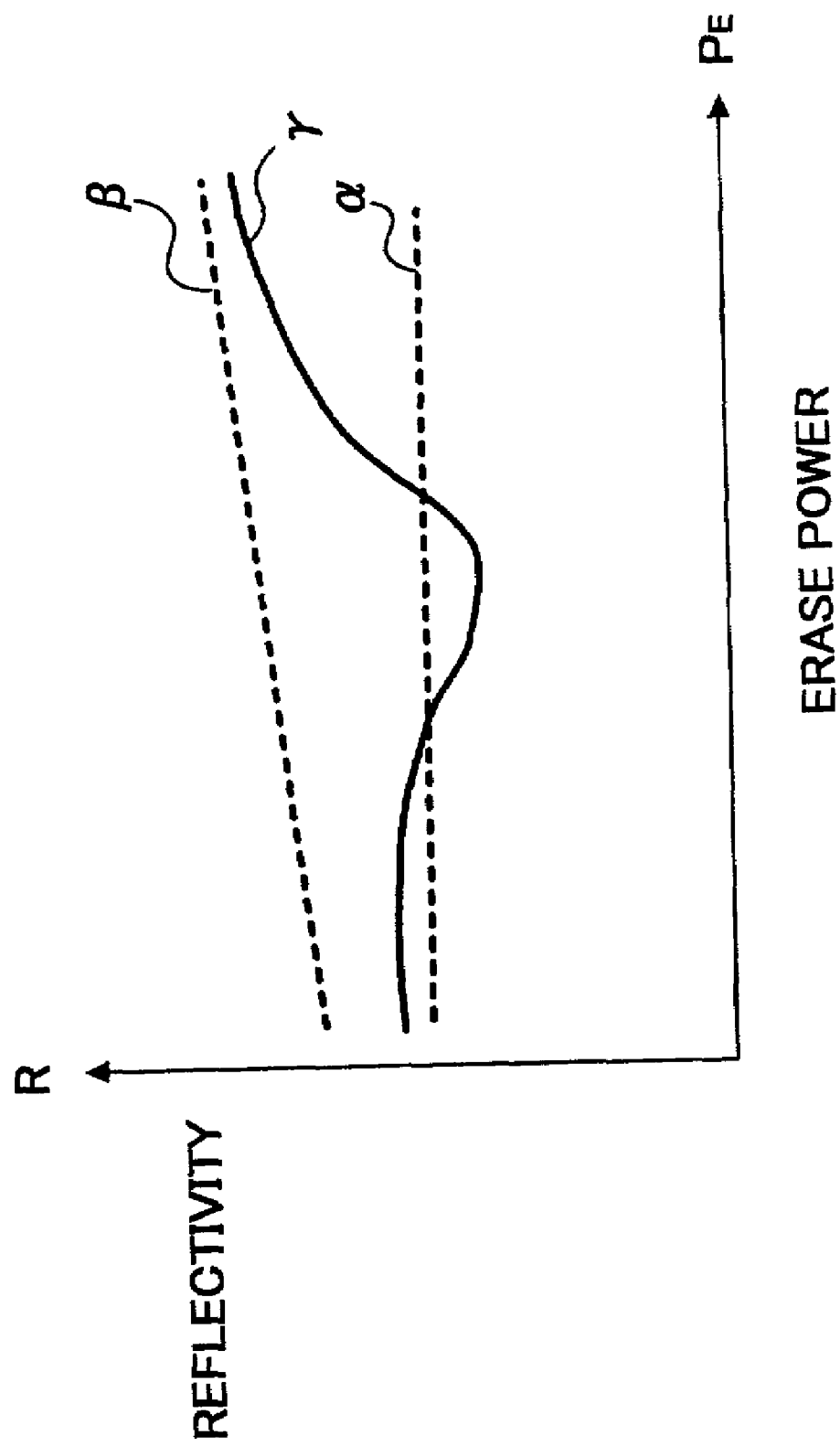
FIG. 3 is prepared to illustrate several types of the change in the reflectivity $R(P_E)$ with erase power $P_E$.

While scanning the optical pickup over the recording medium with a linear scanning velocity v, erase steps are carried out by irradiating a laser beam with a beam power $P_E$ in the DC mode, and subsequently measure reflectivity of irradiated portions with a beam power $P_R$. The results obtained from the measurements are shown in FIG. 3 illustrating the change in the reflectivity with erase power $P_E$. As indicated in FIG. 3, the pattern of the change are broadly divided into three types, α, β and γ.

The pattern of the type α indicates no change in reflectivity, since no appreciable change occurs in recording layer in the present range of scanning velocity v. In contrast, the pattern of the type β indicates a gradual increase in reflectivity with increasing erase power $P_E$, since the recording layer is at an annealing stage, thereby crystallization being promoted with a concomitant increase in reflectivity with increasing beam power $P_E$.

Figure 4:
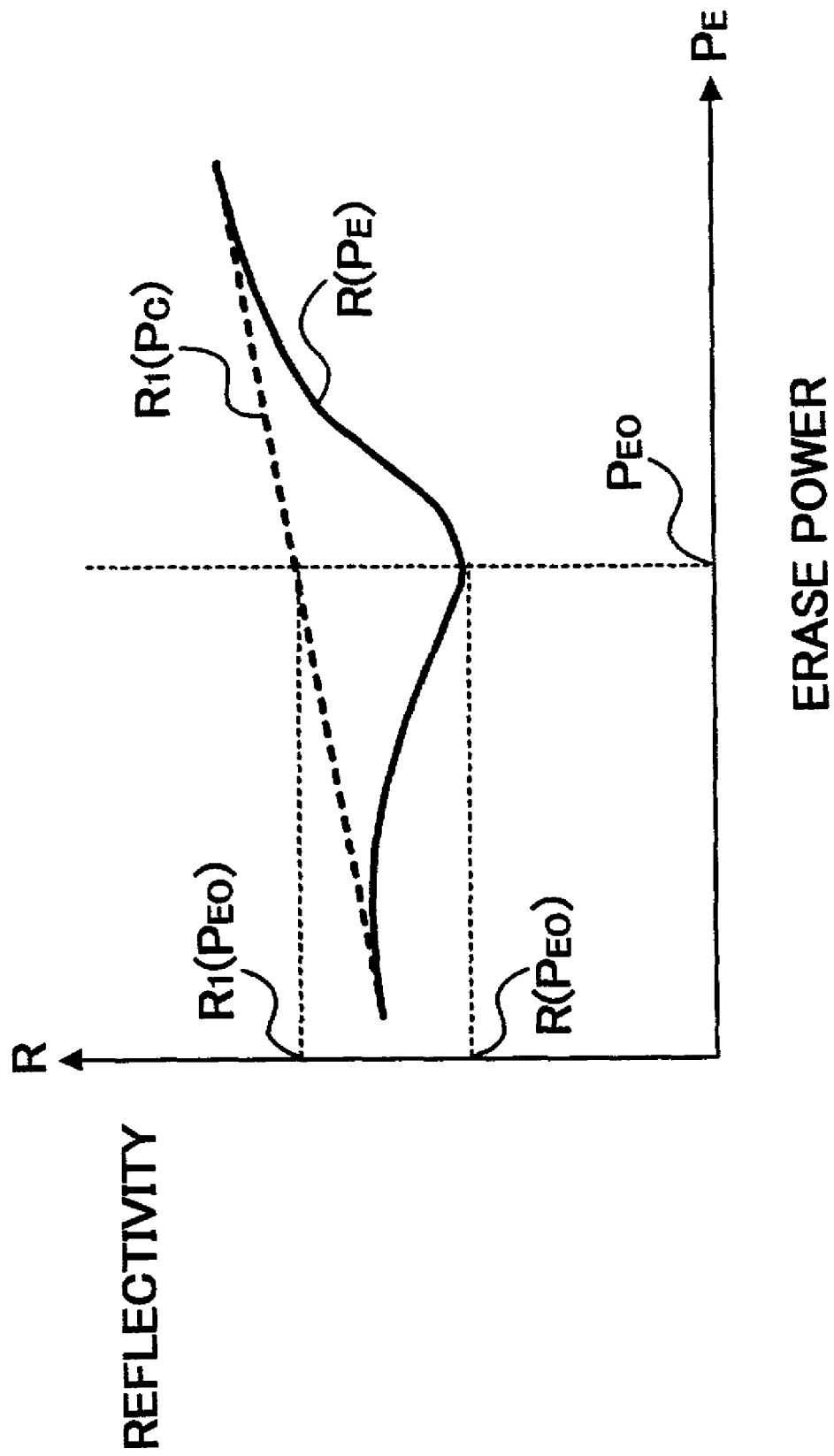
FIG. 4 is prepared to show a reflectivity $R(P_E)$ versus erase power $P_E$ curve together with a straight line $R_1(P_E)$ drawn asymptotically to the curve $R(P_E)$.

Furthermore, there indicated by the change of type γ is the possible formation of amorphous portions in the recording layer depending on the value of erase power $P_E$, to thereby gives rise to a minimum in reflectivity R at a certain erase power $P_E$ (FIG. 4).

Therefore, it is necessary for the optical recording medium disclosed herein be devised such that its reflectivity R has a minimum of the type γ in R versus $P_E$ curve as shown in FIG. 4 at an optimum irradiation power $P_{E0}$ and at an optimum linear scanning velocity $v_0$ of the optical pickup. That is, by exhibiting such minimum in the R versus $P_E$ curve, it is assured for the recording layer to be capable of inducing the phase transition at an optimum scanning velocity $v_0$ of the pickup.

This is requisite for the recording layer to be capable of achieving record/ erase/ overwrite operation. For such a recording medium as exhibiting the above minimum, therefore, it becomes feasible to find an optimum relative recording velocity $v_0$ preferably ranging from 9 m/sec to 20 m/sec, and also find further conditions appropriate for achieving the record/ erase/ overwrite operation with the recording medium.

The disc characteristics for recording operation are exemplified by those in the Orange Book, Part III, Vol. 2, as the rewritable compact discs specification. There included in the conditions are reflectivity, modulation factor, and jitters, after the first recording and also after the first direct overwrite, among others.

It may be noted herein the above indicated optimum relative recording velocity (or linear scanning velocity of the pickup) $v_0$ is preferably adjusted to be the largest of the velocities warranted for the recording medium, so as to attain the best possible disc characteristics.

The disc characteristics required primarily for this adjustment are modulation factor and jitters after the first recording; and reflectivity, modulation factor and jitters, after the first direct overwrite, for example.

For the type γ reflectivity versus erase power curve, a straight line, $R_1(P_E)$, can be drawn asymptotically to the curve, $R(P_E)$, as shown in FIG. 4, since the function $R(P_E)$ approaches asymptotically to the function $R_1(P_E)$ as $P_E$ approaches either 0 ($P_E \rightarrow 0$) or infinity ($P_E \rightarrow \infty$).

It should be noted that the asymptotic function $R_1(P_E)$ represents the change in reflectivity with $P_E$ for the recording layer consisted of only crystalline portions without amorphous portions. As a result, it is indicated that the larger the difference between these functions, $R(P_E)$ and $R_1(P_E)$, more stable the amorphous portions, that is, more difficult to be crystallized.

In addition, with the reflectivity value, $R_1(P_{E0})$, as the value which corresponds to the optimum $P_E$ value (i.e., $P_E = P_{E0}$), a ratio, $R_1(P_{E0})/R(P_{E0})$, may be herein adopted to represent the difference between the above noted functions, $R(P_E)$ and $R_1(P_E)$.

Accordingly, by adjusting the ratio so as to satisfy the relation $$R_1(P_{E0})/R(P_{E0}) < 1.4,$$

it becomes feasible for the recording layer to attain the erasure of recorded marks, having excellent characteristics after the first direct overwrite, such as jitters, in particular.

It is also noted the ratio, $R_1(P_{E0})/R(P_{E0})$, has a considerable effect on the contrast between recorded marks and land portions. As the ratio decreases, C/N ratios of output signals decrease, and the recording media thus formed have low modulation factors.

In order to form recording media with high modulation factors and C/N ratios, therefore, the ratio, $R_1(P_{E0})/R(P_{E0})$, is preferably adjusted to satisfy the relation $$R_1(P_{E0})/R(P_{E0}) > 1.05.$$

The slope of the asymptotic straight line, $dR_1/dP_E$, is highly dependent on media properties resulted from the initialization. When the recording medium is initialized with a relatively high beam power and low scanning speed, both large crystallite size in the recording layer and high reflectivity are attained. In contrast, when initialized with a low beam power and high low scanning speed, both crystallite size and reflectivity decrease.

When an initialization apparatus is used being equipped with an optical unit having a laser beam with λ=790 nm emission, and the beam width in the direction along, and perpendicular to, the scanning direction, 10 mμ and 100 mμ, respectively, the conditions for the initialization are as follows: For the beam power, the high power preferably ranges from 700 mW to 900 mW, while the low power ranges from 500 mW to 800 mW. In addition, the high scanning speed preferably ranges from 4 m/sec to 10 m/sec, while the low speed ranges from 0.5 m/sec to 5.0 m/sec.

In the low reflectivity case, the slope of normalized asymptotic straight line, $dR_1(P_E)/dP_E$, is relatively large, which is indicative of improved first direct overwrite characteristics, since the reflectivity deference can be decreased between the following two steps, one erasing recorded mark (i.e., recording a land onto the mark) and the other re-erasing land (i.e., recording a land onto the previously formed land). This leads the following relation to be satisfied by the slope, $\{dR_1(P_E)/dP_E\} > 0.001\%/mW.$ When the slope, $dR_1(P_E)/dP_E$, is too large, in contrast, the recording medium tends to have large fluctuations in reflectivity, since the magnitude of the reflectivity increases with increasing number of repeated overwrite cycles.

Therefore, in order to retain the reflectivity fluctuation within an appropriate magnitude, it is preferable the slope, $dR_1(P_E)/dP_E$, be adjusted as $\{dR_1(P_E)/dP_E\} < 0.5\%/mW.$ The values, $R(P_E)$ and $R_1(P_E)$, can appropriately be adjusted by individually adjusting and optimizing (1) the composition of constituent elements and additives, and/or (2) the thickness of the layers in the recording medium, such as recording, lower dielectric, upper dielectric, reflective/heat dissipating, and overcoat layers.

Of these layers, it is feasible with relative ease particularly with the recording layer to achieve such optimization by appropriately adjusting its composition and additives.

For example, this can be achieved with the AgInSbTe material by minutely adjusting the compositional ratio of Sb and Te, as major components, and the amount of N elements as additives. In a similar manner, the values, $R(P_E)$ and $R_1(P_E)$, together with the magnitude of their changes with $P_E$ may be brought into a desired range by again adjusting and optimizing the thickness of the recording layer.

As indicated earlier, recording capabilities at higher velocities are closely related to the crystalline state of the recording layer: For example, although recording materials, which tend to be crystallized with more ease even at higher recording velocities, are preferably selected to achieve high recording speeds, these recording materials, in general, have low crystallization energy (or activation energy of crystallization). For the low crystallization energy, the capabilities of recording, repeated recording (i.e., overwrite) and erasing, at high recording speeds are generally improved, while storage durability decreases.

Although the activation energy of transition from amorphous marks to crystalline portions may be obtained for a single, isolated recording layer by ordinary methods using the layer of recording material, a real actual activation energy is considered different in general, since the recording layer is actually placed in recording medium environment. Accordingly, it is more realistic to obtain the energy value for a recording layer incorporated into the media, as described in Japanese Laid-Open Patent Application No. 8-263871.

In addition to the above noted activation energy of transition, activation energy of media deterioration will be detailed herein below. The deterioration of an optical recording medium is evidenced by the decrease in reflectivity with time, for example.

The decrease in reflectivity, in turn, is caused by local defects in the recording layer. In addition to the reflectivity decrease, the local disorder affects media characteristics such as the stability of recorded marks, for example. With the progress in the deterioration, there found are the increase in recording errors and also in jitters which are originated from uneven size of recorded marks, resulted from uneven deteriorating effects of local disorder.

In order to achieve and also retain stable media characteristics, therefore, it is important to evaluate the deteriorating effects. The present inventors examined in detail the effects, and found the activation energy of deterioration is adequately expressed by the parameter, asymmetry, which will be described herein below.

First, the signals which previously recorded in a recording medium are readout and then subjected to various measurements, using an optical pickup under the following conditions.

$\lambda$=795 nm in laser wavelength,
NA=0.50, and
Laser power=0.70 mW.

Figure 5:
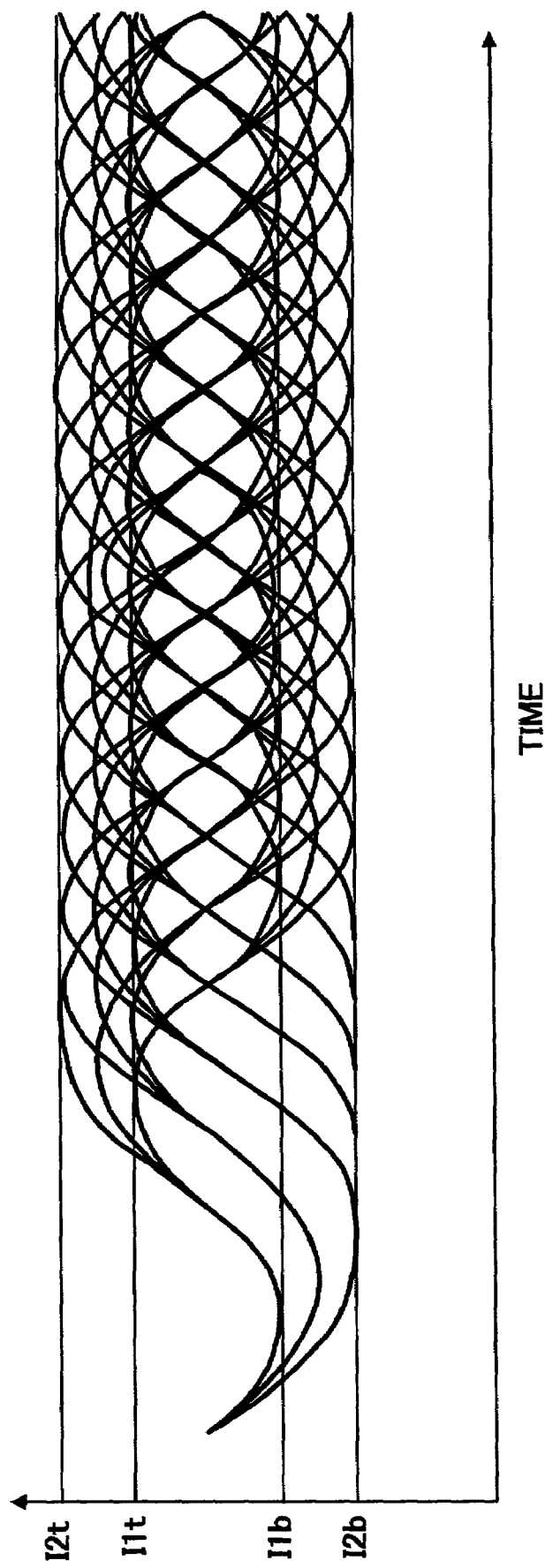
FIG. 5 illustrates the pattern of the signals readout from recording medium disclosed herein.

For CD and DVD recording media, the shape of the readout signal is typically shown in FIG. 5. With I1t and I1b being the values for the peak and bottom of the signal readout from the shortest mark, respectively, and I2t and I2b being the similar values readout from the longest mark, respectively, the asymmetry, A, is defined by the equation, $$A(\%) = [\{(I1t+I1b)/2 - (I2t+I2b)/2\}/(I2t-I2b)] \times 100. \quad (1)$$

The asymmetry, A, is also defined in a similar manner, in several compact disc specifications such as the Red Book, Orange Book and Yellow Book, in that it is noted as one of important media characteristics.

In addition, the asymmetry, A, is one of the most effective parameters to measure the degree of deterioration for the signals from the shortest recorded mark, which is most susceptible to the state of crystallization in the recording layer. The state of crystallization is, in turn, closely related to the above noted deterioration effects.

Furthermore, the asymmetry A is also one of the most effective parameters to estimate the durability of the recording medium, since it changes almost linearly with time, which adequately corresponds to the change due to the deterioration.

It may also be added the asymmetry A is quite effective as a parameter to evaluate the properties of the recording medium, to hereby yield the activation energy of the deterioration of the medium, since the measurements can be carried out with relative ease not only for single, isolated recording layer but also the recording layer incorporated into the recording medium.

Figure 6:
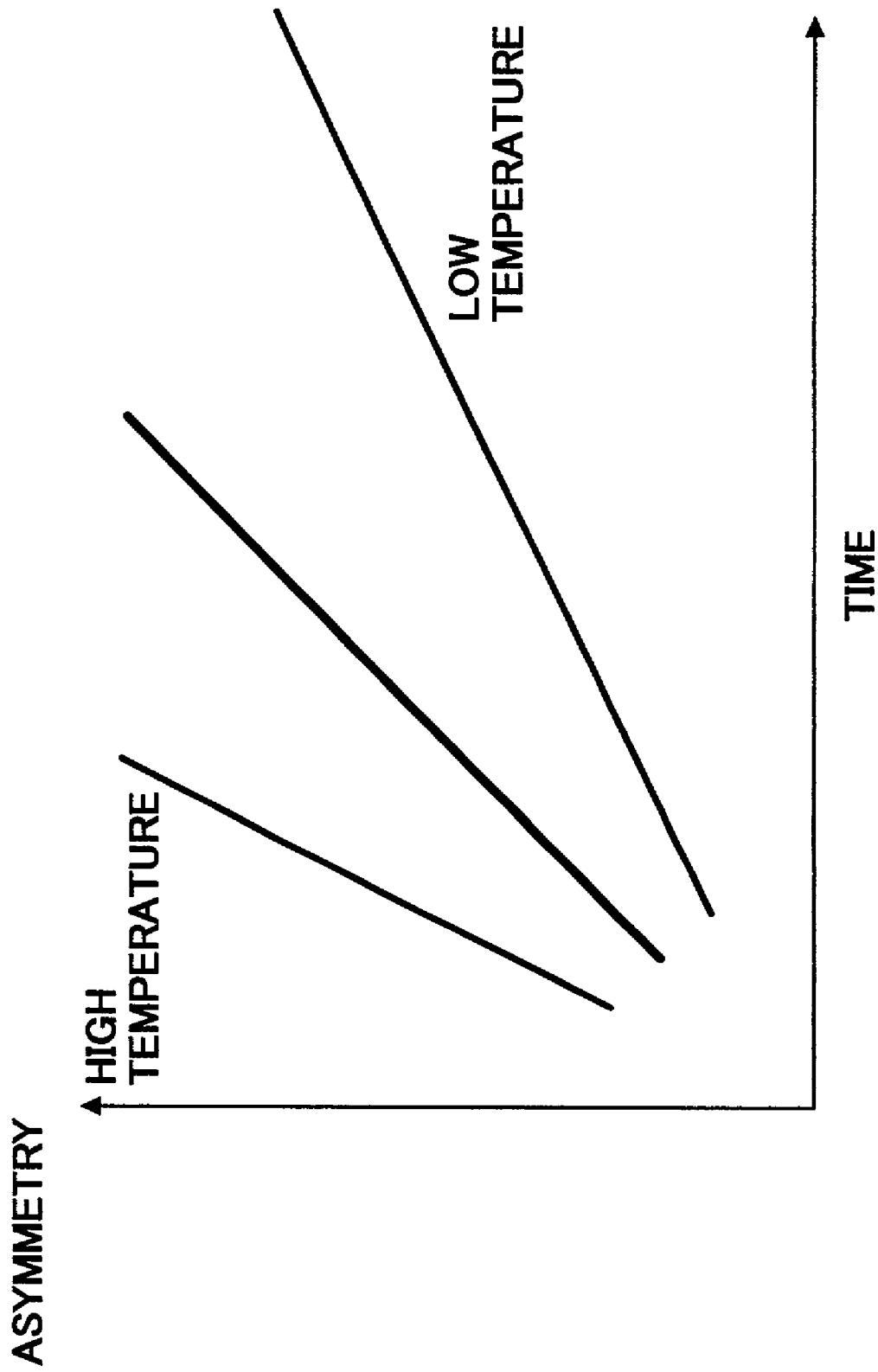
FIG. 6 is prepared to illustrate the change in asymmetry with storage time at different storage temperatures.

FIG. 6 is prepared to illustrate the change in asymmetry A with storage time at different temperatures. It is indicated that the asymmetry A is proportional to the storage time, and that the slope is larger at higher temperatures, while the slope is smaller at lower temperatures.

With the storage time t and storage temperature T, the following equation is found;

$A = (1/k)t + C.$

After differentiating the equation with respect to A, there obtained is the relation $$k = dt/dA. \quad (2)$$

Figure 7:
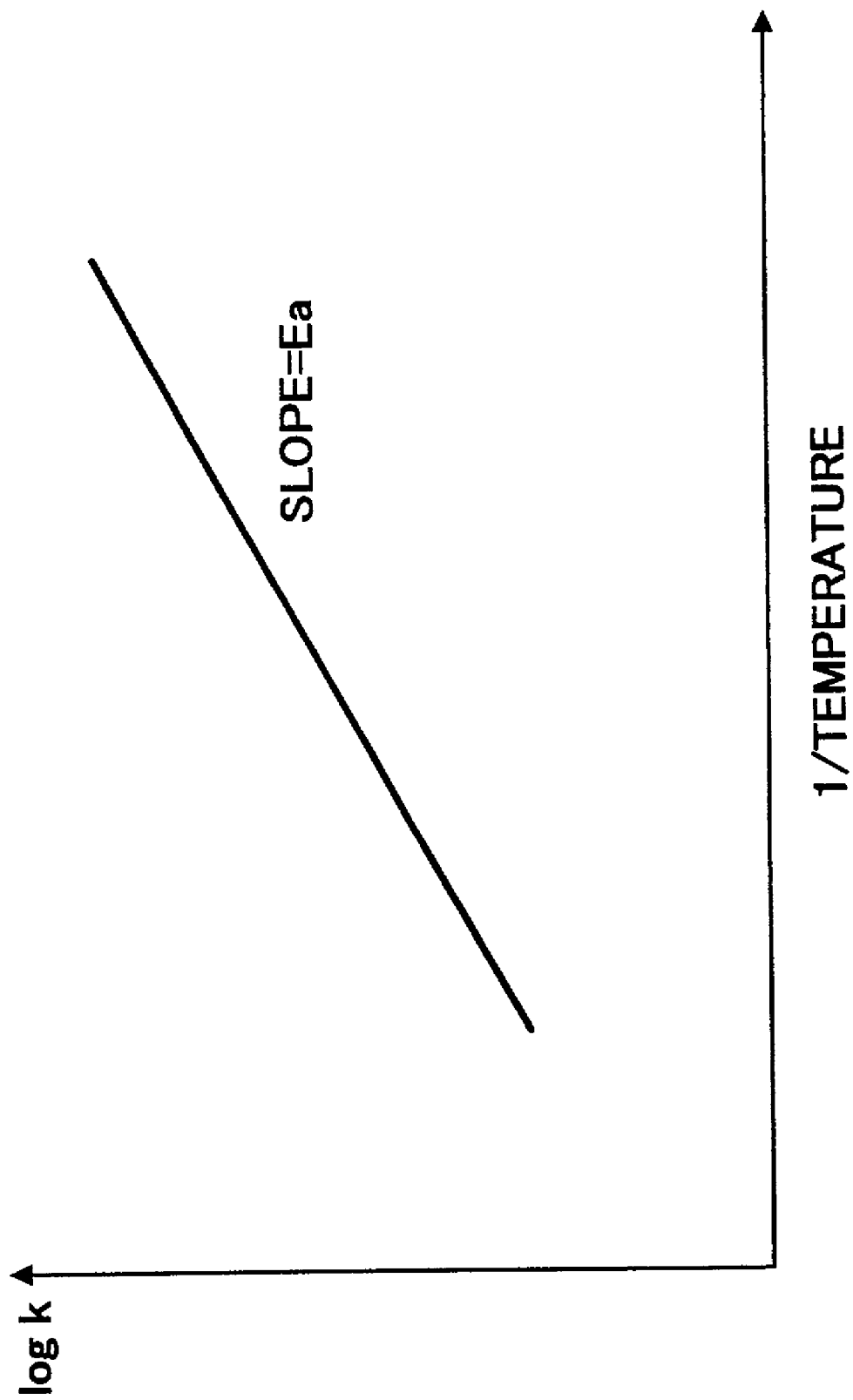
FIG. 7 is prepared to show the change in the parameter, k, with storage temperature.

The constant k has been found to be a function of temperature T, in that $1/k = 1/k_0 \times \exp(-E_a/k_B T)$, or $$k = k_0 \times \exp(E_a/k_B T), \quad (3)$$

where $k_0$ and $E_a$ are each constants, $k_B$ Boltzmann's constant, and T degree in Kelvin (FIG. 7).

From the equations, (2) and (3), the activation energy of deterioration, $E_a$, is obtained to be 1.6 eV for the recording medium disclosed herein, and the activation energy of 1.6 eV or larger is preferred in practice.

Accordingly, by devising recording media to have an activation energy of 1.6 eV or larger, excellent media characteristics can be achieved in recording capabilities at high recording velocities, storage durability at least at room temperature, and reliability in general.

In addition, it is also found the activation energy is preferably 3.0 eV or smaller. The energy larger than 3.0 eV tends to cause considerable difficulties in crystallization. As a result, the decrease in recording sensibilities and erase capabilities, at high recording velocities, and in overwrite characteristics may result.

As indicated earlier, information recording process steps disclosed herein are carried out with an optical pickup equipped with a semiconductor laser device. Laser beams emitted from the laser device are focused and then irradiated onto a recording medium, to thereby induce the reversible phase transition in the recording layer between the amorphous (metastable) and crystalline (stable) states.

Recorded marks are formed as amorphous regions, or metastable regions, which are imbedded in stable, crystalline portions in the recording layer. The transition in the recording layer from the metastable state to stable state is induced by either slow cooling from melt, or displacement of the amorphous-crystalline boundary below melting point (eutectic temperature). In the recording materials disclosed herein, it is preferable for the transition be due to the latter, the displacement of the boundary.

In the case of the boundary displacement, the temperature of the recording layer need not be raised higher than the melting temperature. Recorded marks can therefore be erased with relative ease, and heat damages caused in the recording layer can be reduced. As a result, optical information recording media can be provided having excellent disc properties such as high reflectivity and modulation ratio, and reduced jitters.

In addition, by introducing and suitably adjusting the parameters to be used to control the boundary displacement, such as, for example, an activation energy of the displacement, first overwrite characteristics can be improved, which will be detailed herein below.

Since the displacement of the amorphous-crystalline boundary takes place in a thin film of the recording layer, the displacement is assumed to be two-dimensional, and the area, S, is assumed as that occupied by recorded marks and projected onto a plane normal to the surface of the thin film.

Since recorded marks are formed as amorphous regions (or metastable regions) which are imbedded in stable, crystalline portions in the recording layer, as indicated earlier, the transition from the metastable to crystalline state generally takes place as the displacement of the amorphous-crystalline boundary with time. As a result, the above-assumed area S decreases with time.

Since the boundary displacement is caused by the progress in crystallization at, or in the vicinity of, the amorphous-crystalline boundary, the placement is closely related to the diffusion, and subsequent rearrangement, of atoms, when viewed microscopically. As a result, the magnitude of the boundary displacement is highly dependent on the temperature of the recording layer.

As clarified by numerous studies on order-disorder transitions in alloys, it is well known the boundary displacement is adequately approximated by the diffusion process. In this process, the diffusion constant is also known to be specified by the Arrhenius' relation with activation energy, $E_a'$, $$D \propto \exp(-E_a'/k_B T).$$

Figure 8:
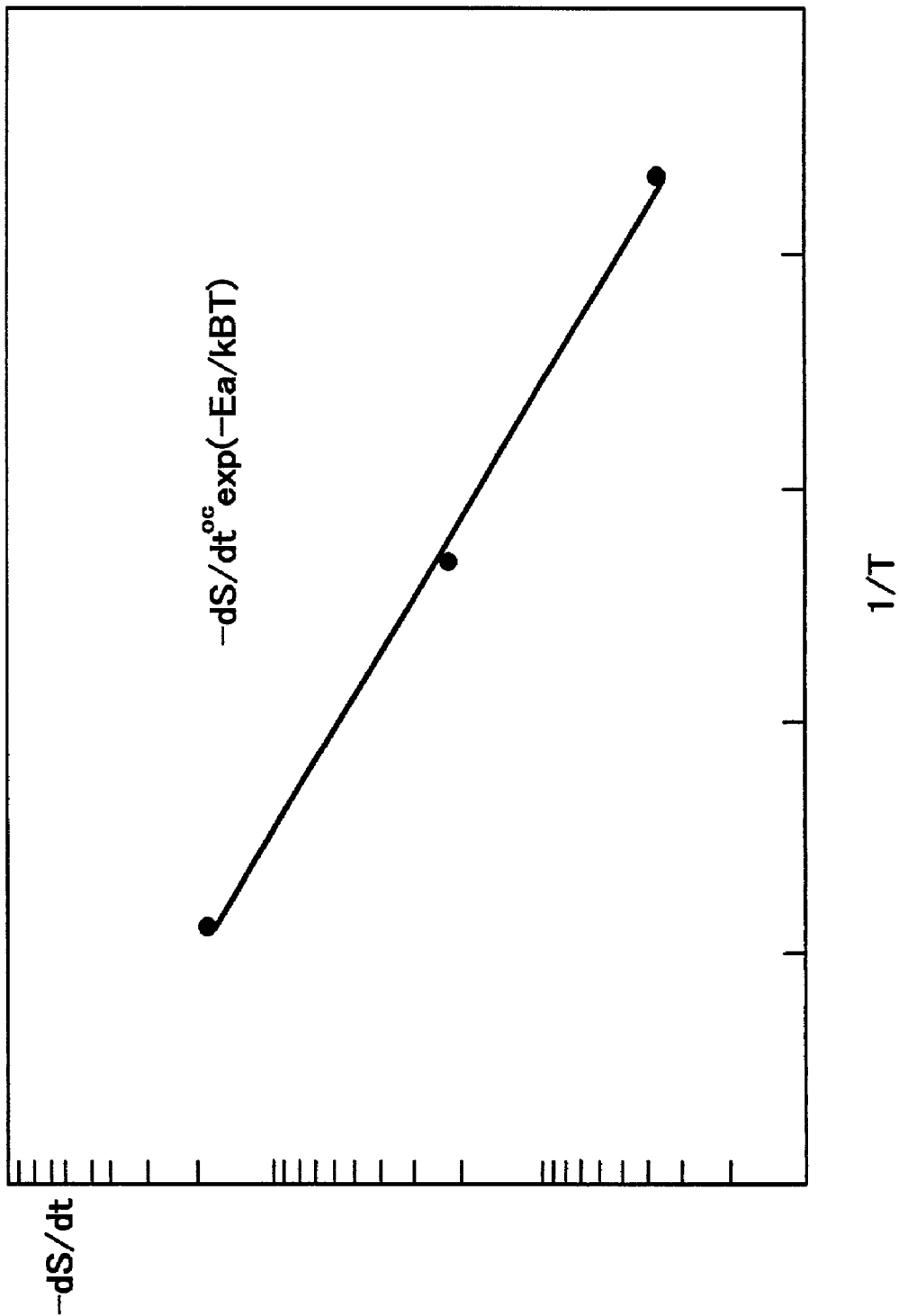
FIG. 8 is prepared to illustrate the Arrhenius' plots obtained from experimental results on the recording medium disclosed herein.

Through the detailed analysis on crystallization mechanism carried out by the present inventors, it was found that the speed of the decrease in the aforementioned area S with time t, $-dS/dt$, is adequately approximated by the Arrhenius' relation, whereby the following relation was obtained (FIG. 8), to yield an activation energy, $E_a'$, of boundary displacement, as $$-dS/dt \propto \exp(-E_a'/k_B T). \quad (4)$$

In this context, this activation energy of boundary displacement, $E_a'$, is considered in comparison with the aforementioned activation energy of deterioration, $E_a$.

As described earlier, the latter activation energy is related to the crystallization of recording layer, in which a recording material having a relatively low crystallization energy (or small activation energy of crystallization) has a relatively low crystallization energy (or small activation energy of crystallization) and tend to be crystallized with more ease. With this low crystallization energy, high recording speeds may be achieved, while storage durability decreases.

The former activation energy is, in contrast, related to the transition between recorded marks (amorphous) and crystalline portions in the recording layer, which is caused by the displacement of the amorphous-crystalline boundary, and its activation energy dictates the dependence of the transition on the temperature and other conditions of the recording layer. With low former activation energy, amorphous recorded marks can be crystallized with more ease, to thereby improve first overwrite characteristics such as jitters, for example. However, a too small value of the activation energy causes the crystallization even at room temperature, thereby considerably reducing the life of the medium.

Although these two activation energies may thus appear to be similar, and possibly correlated, one another, since they both are related to crystallization of the recording layer, an in-depth analysis has yet to be made in more detail. At present, they are defined differently and utilized to describe different characteristics of the recording medium.

Now, regarding the activation energy of boundary displacement, $E_a'$, it is found to have a large effect on overwrite characteristics of the recording medium. By devising the recording medium having reduced activation energy, therefore, the crystallization can be achieved with relative ease. As a result, since amorphous recorded marks can be crystallized with low erase power, first overwrite characteristics such as jitters, in particular, can be improved.

The deterioration in jitters is caused, in general, by the difference in reflectivity between two portions, one being erased recorded marks and the other being erased land (crystallized) portion. By reducing the activation energy, therefore, the above noted difference is lowered, whereby jitters can be reduced.

In order to reduce the jitters after the first overwrite characteristics for present recording medium, the activation energy is preferably adjusted to be smaller than 2.4 eV.

In contrast, a too small value of the activation causes the crystallization even at room temperature, thereby considerably reducing the life of the medium. The activation energy is therefore preferably be adjusted to be larger than 1.0 eV.

The magnitude of the activation energy can suitably be adjusted primarily by optimizing the composition, and the thickness, of the recording layer. In addition, by adding further elements such as those aforementioned into the recording layer, additional minute adjustments of the disc properties become feasible.

The methods for obtaining the activation energy, $E_a'$, are described as follows. The methods are broadly divided into two groups, one being microscopic methods using, for example, TEM (transmission electron microscope) and SEM (scanning electron microscope), the other being conventional readout method using an optical pickup.

In the method in the first group, rather tedious preparation process is needed to prepare test samples and the testing is so called destructive. Therefore, the method using an optical pickup is preferred. Using the pickup in this method, amorphous marks are recorded to have the size comparable to, or smaller than, that of the beam used in measurements, and subsequently the reflectivity and its amplitude are measured, in which the latter is known to be proportional to the area of the marks.

In the pickup method, in addition, the measurements can be carried out over the sample area and a number of the marks can be measured and then averaging of the results becomes feasible to thereby yield the results with high reliability and few scattering.

For CD-RW media, for example, the measurements are made by first recording and then reading out signal patterns consisting of only 3T marks and 3T lands, measuring 3T signal output, and obtaining the amplitude and modulation factor of the signal.

The decrease in the area S is then obtained and the activation energy can be calculated by using the relation (4). Namely, for the 3T modulation factor, m3, the following relation is obtained with time t.

$$-dm3/dt \propto -dS/dt \propto \exp(-E_a'/k_B T). \quad (5)$$

Therefore, the activation energy can be obtained by the relation (5), through the measurements changing the temperature T and time T.

Specifically, the recording medium to be measured is preferably annealed at high temperatures, and then measurements are made on the change in the modulation factor with time.

Having generally described the present disclosure, the following examples are provided further to illustrate preferred embodiments. This is intended to be illustrative but not to be limiting to the materials, apparatuses or methods described herein.

EXAMPLES

Example 1

In order to examine in detail relative velocities of phase change and related parameters, an optical recording medium was formed.

The recording medium includes at least a transparent substrate of polycarbonate for use in CD-RW discs, provided with guide tracks of a continues spiral groove, and constituent layers formed thereon in order as follows: A lower dielectric layer, a recording layer, an upper dielectric layer, and a reflective/ heat dissipating layer.

For forming the respective layers, the following materials were used: An alloy of AgInSbTe added with a minute amount of N for forming the recording layer, a $SiO_2 \cdot ZnS$ composition for the lower and upper dielectric layers, and an AlTi alloy for the reflective/heat dissipating layer.

The lower and upper dielectric layers were deposited by PF sputtering, and both recording and reflective/heat dissipating layers were formed by DC magnetron sputtering. The thickness of the lower and upper dielectric layers were optimized considering their optical thermal properties, to thereby be adjusted as 80 nm and 30 nm, respectively. In addition, the reflective/heat dissipating layer was formed having a thickness of 140 nm.

Further recording media were formed in a similar manner as above with the exception that the thickness and materials composition for the recording layer were varied, whereby eight recording media, sample A through H, were prepared each having different values of $v_0$, $\Delta v_0$, $R_A$ and $R_B$.

The resultant recording layers each have the thickness ranging from 13 nm to 17 nm, with a composition in atomic percent of $(Ag)_\alpha (In)_\beta (Sb)_\gamma (Te)_\delta$, with $0.1 \leq \alpha \leq 3.0$, $5.0 \leq \beta \leq 12.0$ $60.0 \leq \gamma \leq 72.0$, and $22.0 \leq \delta \leq 30.0$.

On the reflective/heat dissipating layer of each recording media, a protective layer was formed by first spin coating a conventional UV curing resinous material in use for compact discs, and subsequently curing under UV light irradiation. The thickness of thus formed protective layer was found in the range from 8 μm to 10 82 m.

The disc samples were then initialized using a CD-RW initialization apparatus under the following conditions:
Power: 650 mW, and
Linear velocity: 3.0 m/sec.

Subsequently, critical relative velocities of phase change were measured for respective initialized discs using an optical disc measurement apparatus, Model DDU1000 from PulseTech Co.

For carrying out record/readout process steps, an optical pickup housed in the optical disc measurement apparatus was operated under the following conditions:
λ: 789 nm in laser wavelength,
NA: 0.49,
Beam spot radius: 0.78 μm, and
Laser power:
  0.7 mW to readout
  5.0 mW to 21.0 mW to record and erase.

The above optical disc measurement apparatus was capable of recording FEM signals at relative recording velocities ranging from 4.8 m/sec (CD4×speed) to 12.0 m/sec (CD10×speed). Readout steps were carried out at 1.2 m/sec relative velocity, and various parameters in the compact disc specification were obtained such as reflectivity and modulation factor.

Using the above noted measurement apparatus, the values, $v_{WH}$, $v_{WL}$ and $P_E$, were adjusted as follows for the disc samples.

$v_{WH} = 12.0$ m/sec, $v_{WL} = 4.8$ m/sec, and $P_E = 0.75 \times P_O = 15.0$ mW, where the value $P_O$ was herein determined by the γ method specified by the Orange Book, Part III.

The parameters such as critical velocity for phase change $v_0$, margin of critical velocity for phase change, $\Delta v_0$, and $R_A$ and $R_B$ at the high and low saturation regions, were subsequently measured for respective disc samples A through E.

Figure 9:
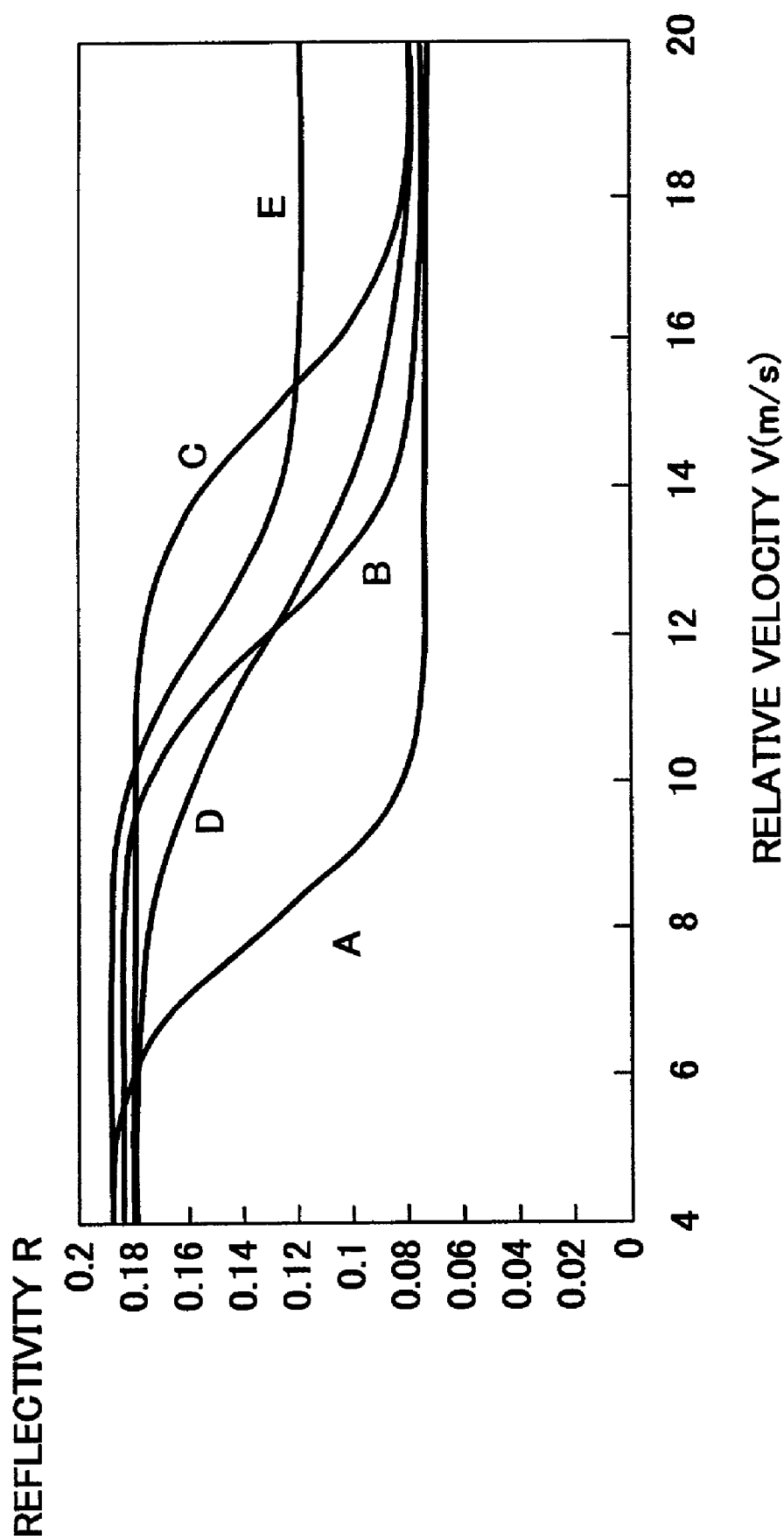
FIG. 9 includes graphical plots illustrating the change in reflectivity R with relative velocity v obtained from the measurements of recording media disclosed herein.
Figure 10:
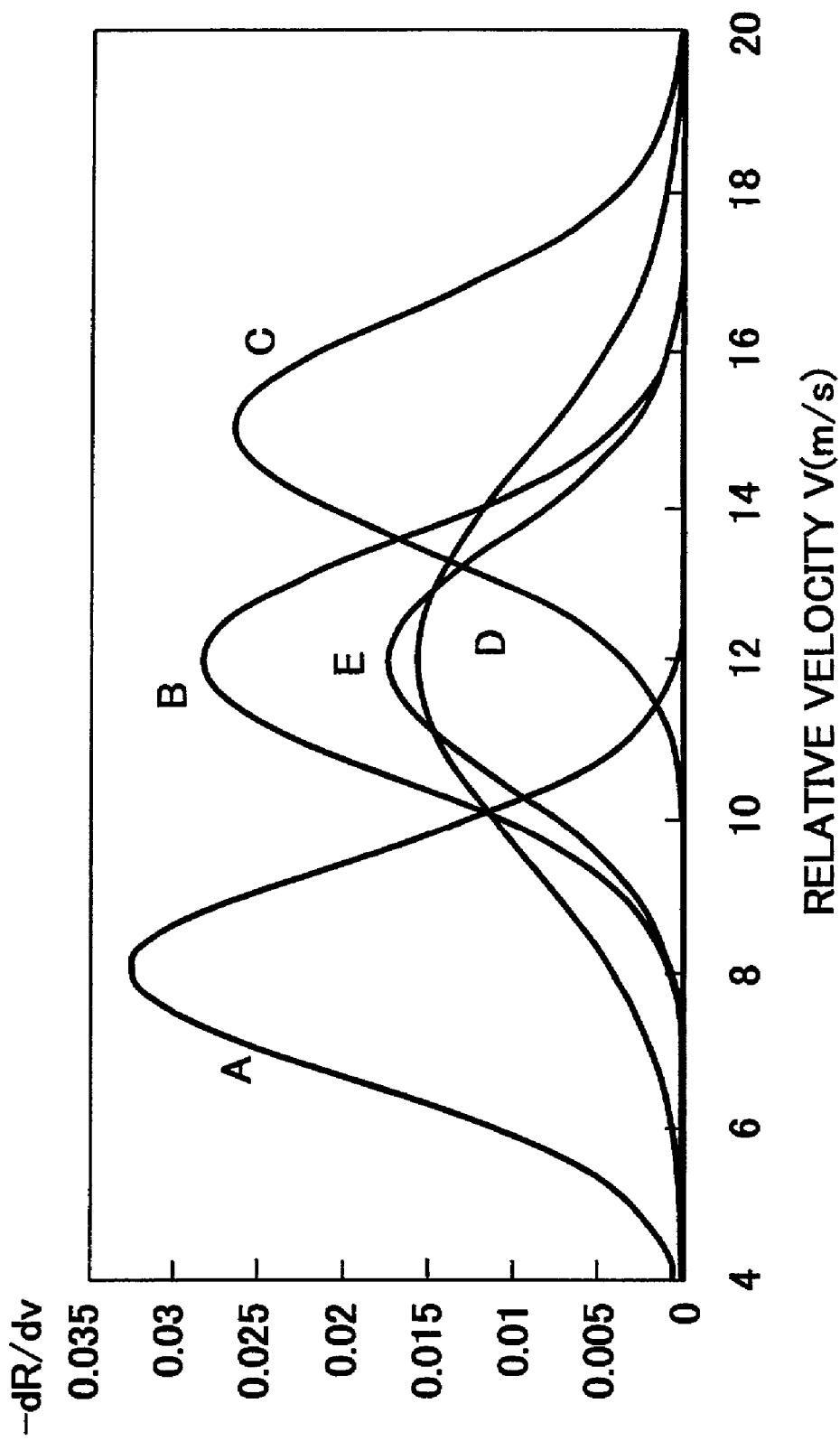
FIG. 10 includes graphical plots illustrating the change in differential coefficient, $-dR_{(v)}/dv$, with relative velocity v obtained from the measurements of recording media disclosed herein.

The results on the change in reflectivity, R, with relative velocity v were obtained from the measurements, and are shown in FIG. 9. Similarly, the results on the change in differential coefficient, $-dR_{(v)}/dv$, with relative velocity v are shown in FIG. 10.

The values, $v_0$, $\Delta v_0$, and $R_A$ and $R_B$, were subsequently calculated from the above-mentioned results, whereby the results are obtained as summarized in Table 1.

Next, recording process steps were carried out with disc samples, A through H, at the velocity of $v_{WH}$=12.0 m/sec and power level of $P_0 \pm 10\%$ (i.e., from 18 mW to 22 mW), with respect to the first recording and 1000 times repeated recording cycles (overwrite). The measurements made herein were with respect to the following items which were selected from Orange Book, Part III, which dictates the standards for rewritable compact discs.

11T modulation factor, 3T land jitters, and 3T pit jitters.

Figure 11:
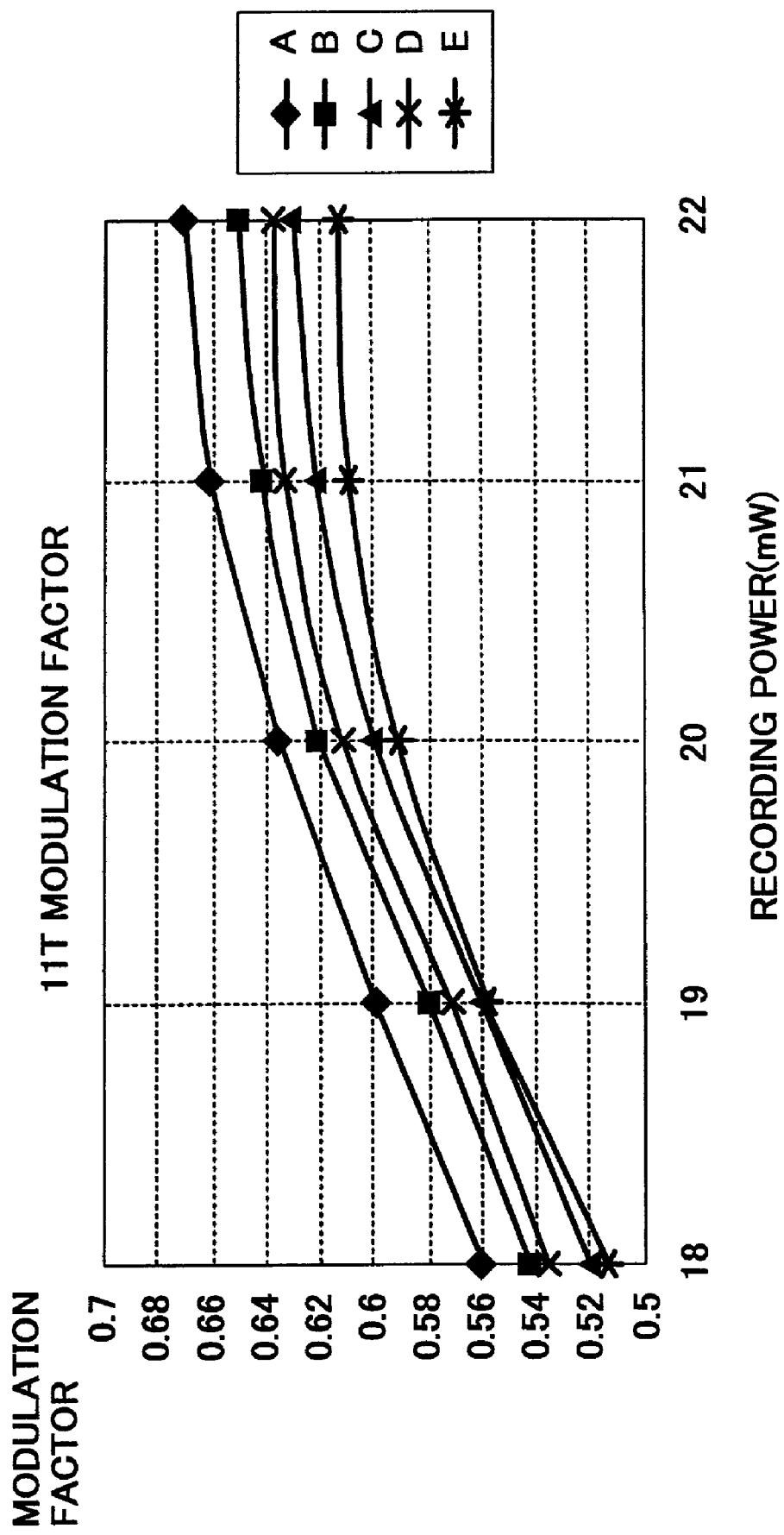
FIG. 11 includes graphical plots illustrating the change in 11T modulation factor with recording power obtained from the measurements of recording media disclosed herein.
Figure 12:
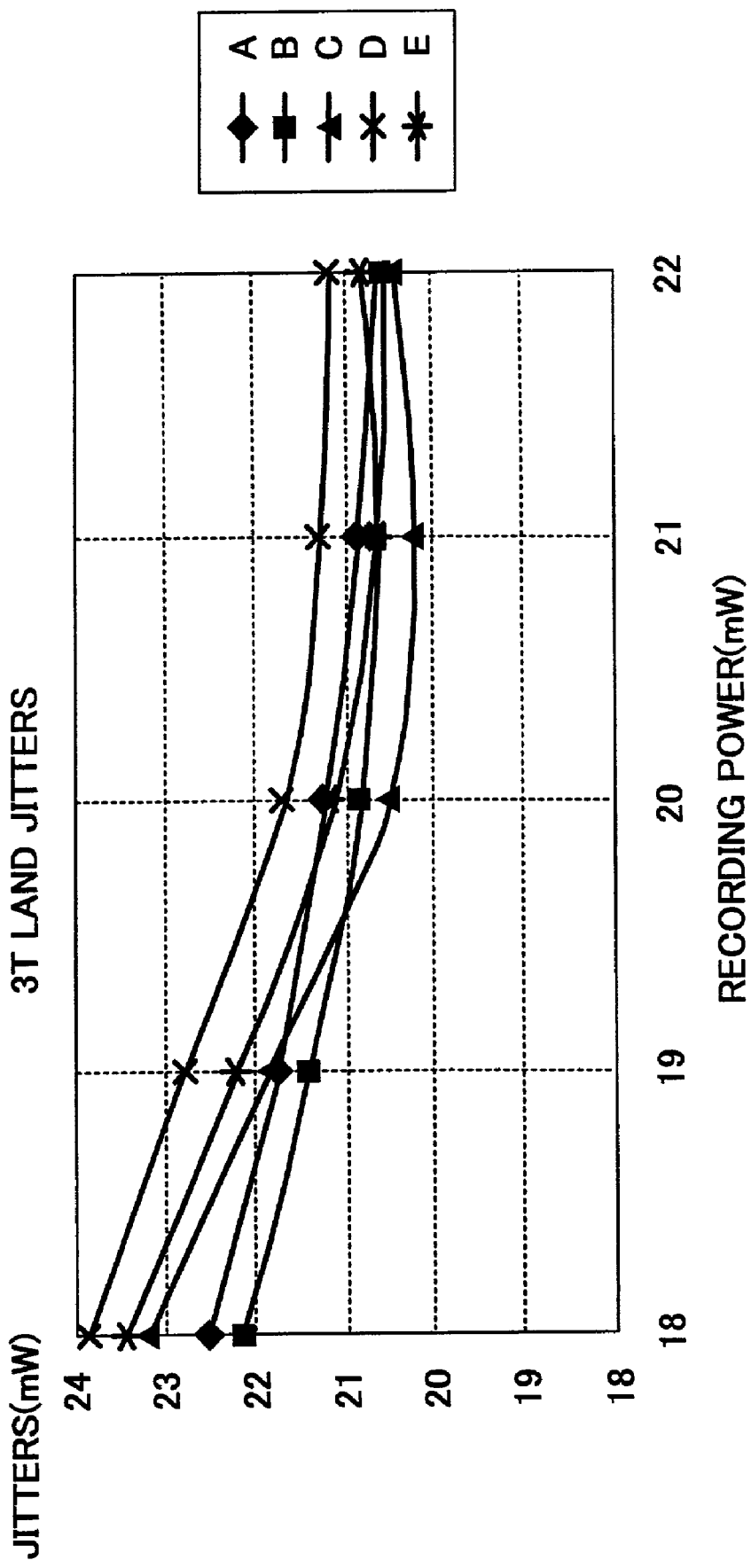
FIG. 12 includes graphical plots illustrating the change in 3T land jitters with recording power obtained from the measurements of recording media disclosed herein.
Figure 13:
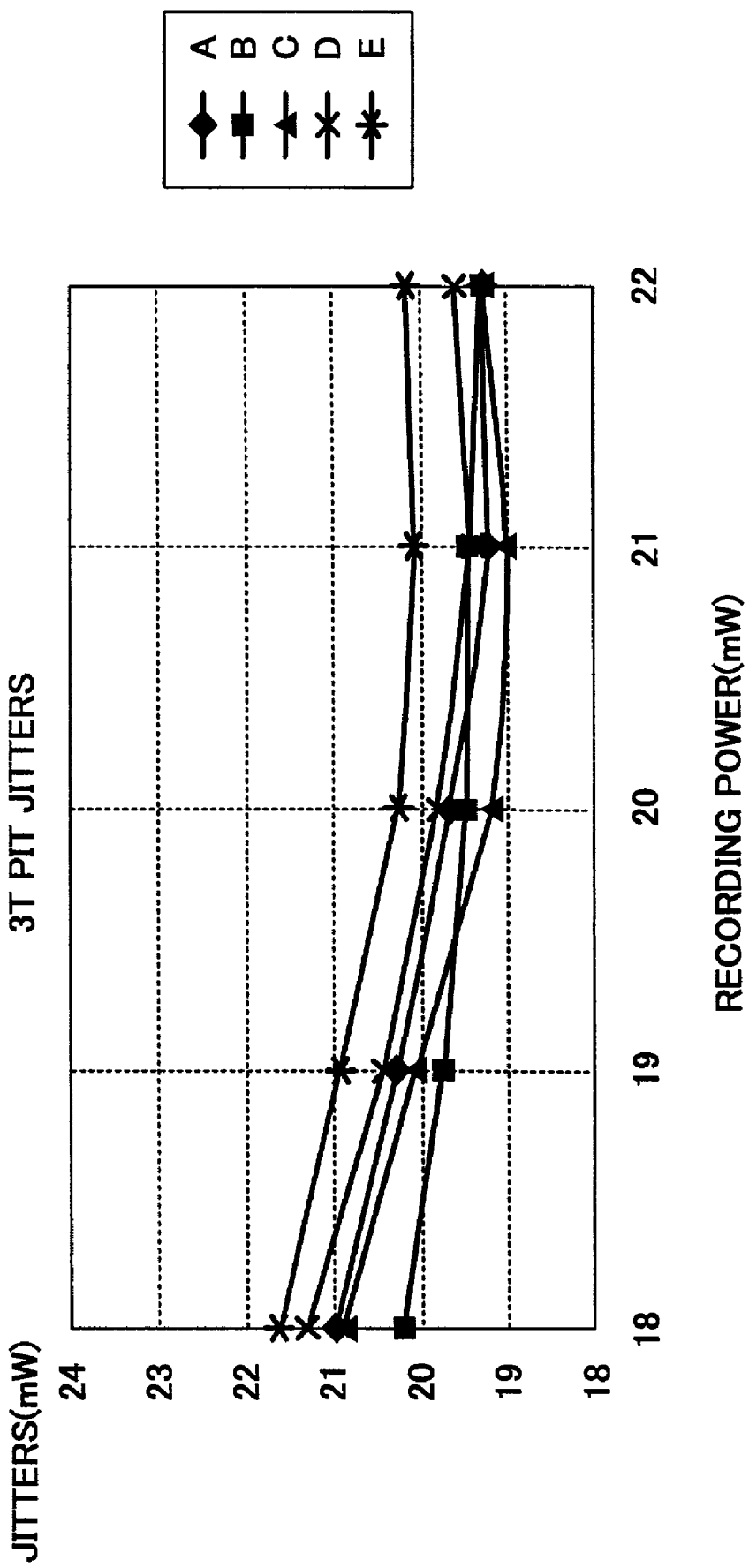
FIG. 13 includes graphical plots illustrating the change in 3T pit jitters with recording power obtained from the measurements of recording media disclosed herein.

The results obtained from the measurements for the sample discs A through E are shown in FIGS. 11, 12 and 13. In addition, the change in 3T land jitter with the number of repeated recording cycles was measured up to 1000 times, and the results are shown in FIG. 14.

Figure 14:
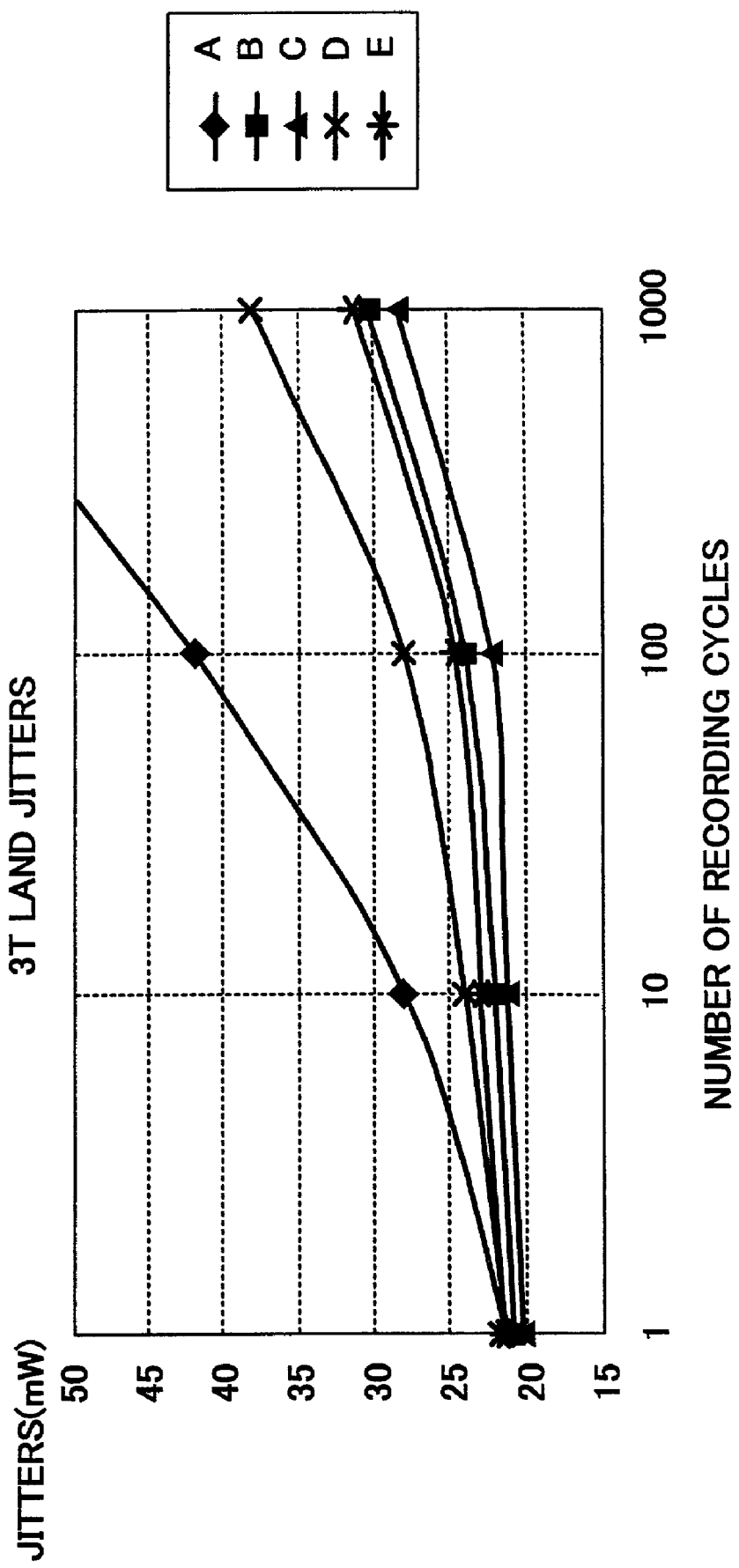
FIG. 14 includes graphical plots illustrating the change in 3T land jitters with the number of recording cycles repeated through 1000 times obtained from the measurements of recording media disclosed herein.

It may be noted herein that (1) since the modulation factor included in FIG. 11 corresponds to the amplitude of readout signals, the larger the modulation factor, the better the readout signal quality, and 11T modulation factor of 0.55 or larger is specified as satisfactory in the Orange Book, Part III, and (2) since the jitters included in FIGS. 12 through 14 reflect the amount of fluctuation with time for digital signals, it is considered the smaller the jitters, the better the readout signal quality, and jitters of 35 nsec or smaller are specified as satisfactory in the Red Book, the standards for compact discs.

From the results included in Table 1, for disc samples B, C, E, F, G and H, jitter values are found smaller than 35 ns after 1000 times repeated recording cycles, in which $v_0$>8.4 m/sec and accordingly $\Delta v_0$<0.4 $v_{WH}$ for these discs. These results therefore indicate that excellent recording characteristics are achieved under the conditions:

$v_0 \geq 8.4$ m/sec =0.7 $v_{WH}$, and $\Delta v_0 < 0.4\, v_{WH}$.

Similarly, from the results included in Table 1, for disc samples B, C, F, G and H, 11T modulation factors were found satisfactory. When the values $R_A$ and $R_B$ were examined, these excellent modulation factors were achieved under the condition of $R_B/R_A < 0.6$.

Example 2

Recording process steps were carried out at the velocity of $v_{WL}$=4.8 m/sec with the same disc samples as those of Example 1, A through H.

Following the recording with a beam power of 19 mW, measurements were carried out with respect to 3T land jitter and 3T pit jitter. In addition, following 1000 times repeated recording cycles with a beam power of 19 mW, 3T land jitters were measured.

Figure 15:
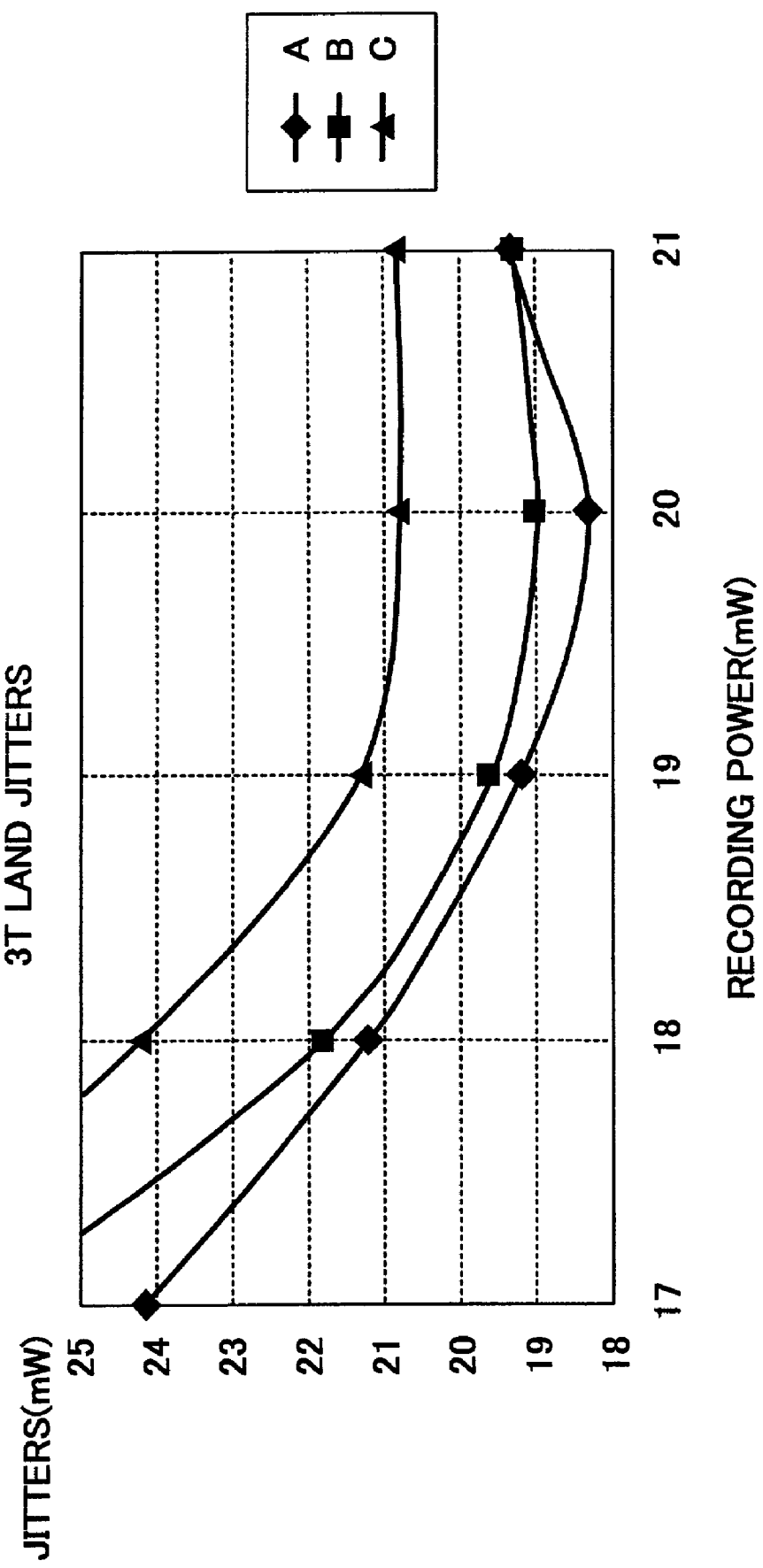
FIG. 15 includes graphical plots illustrating the change in 3T land jitters with recording power obtained from the measurements of recording media disclosed herein.
Figure 16:
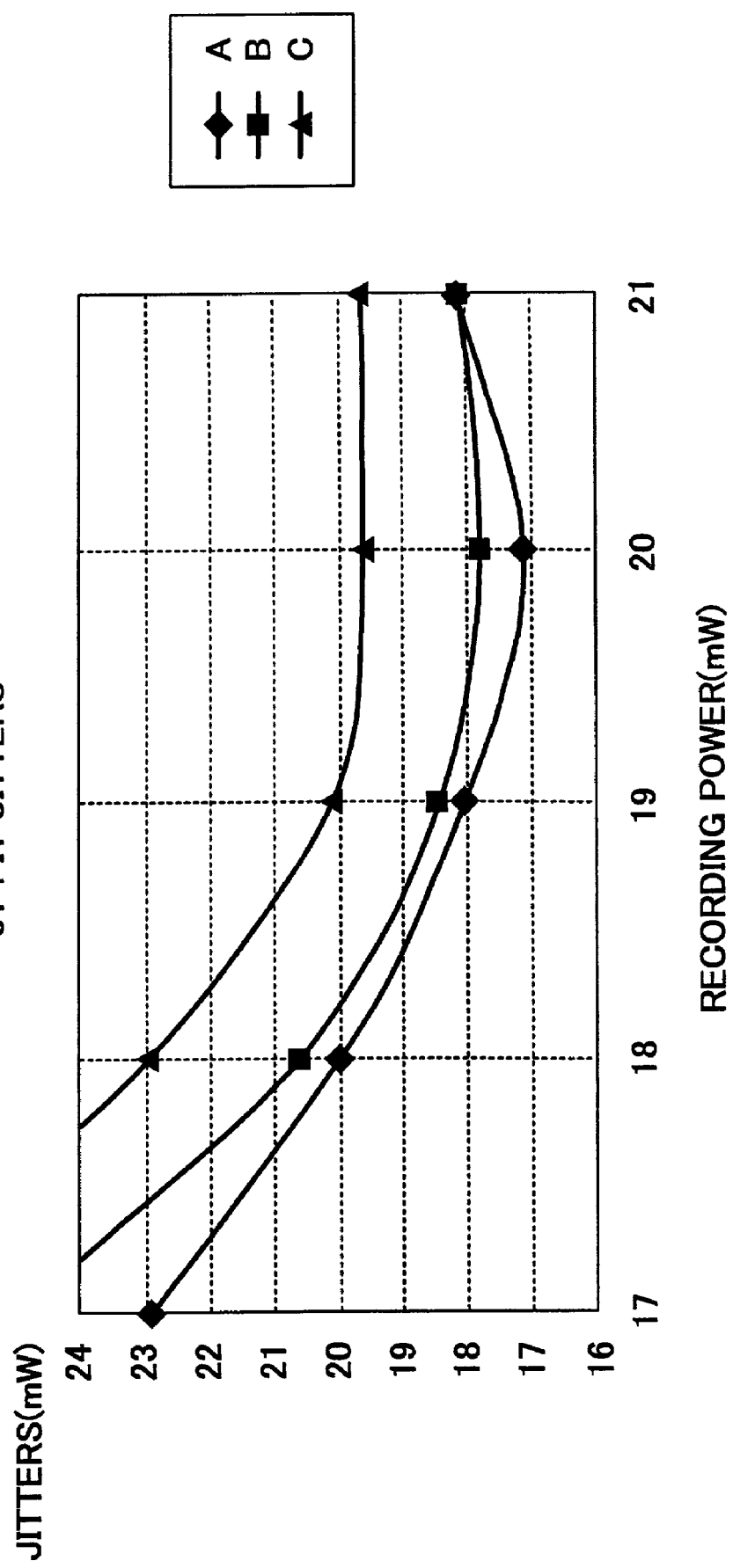
FIG. 16 includes graphical plots illustrating the change in 3T pit jitters with recording power obtained from the measurements of recording media disclosed herein.
Figure 17:
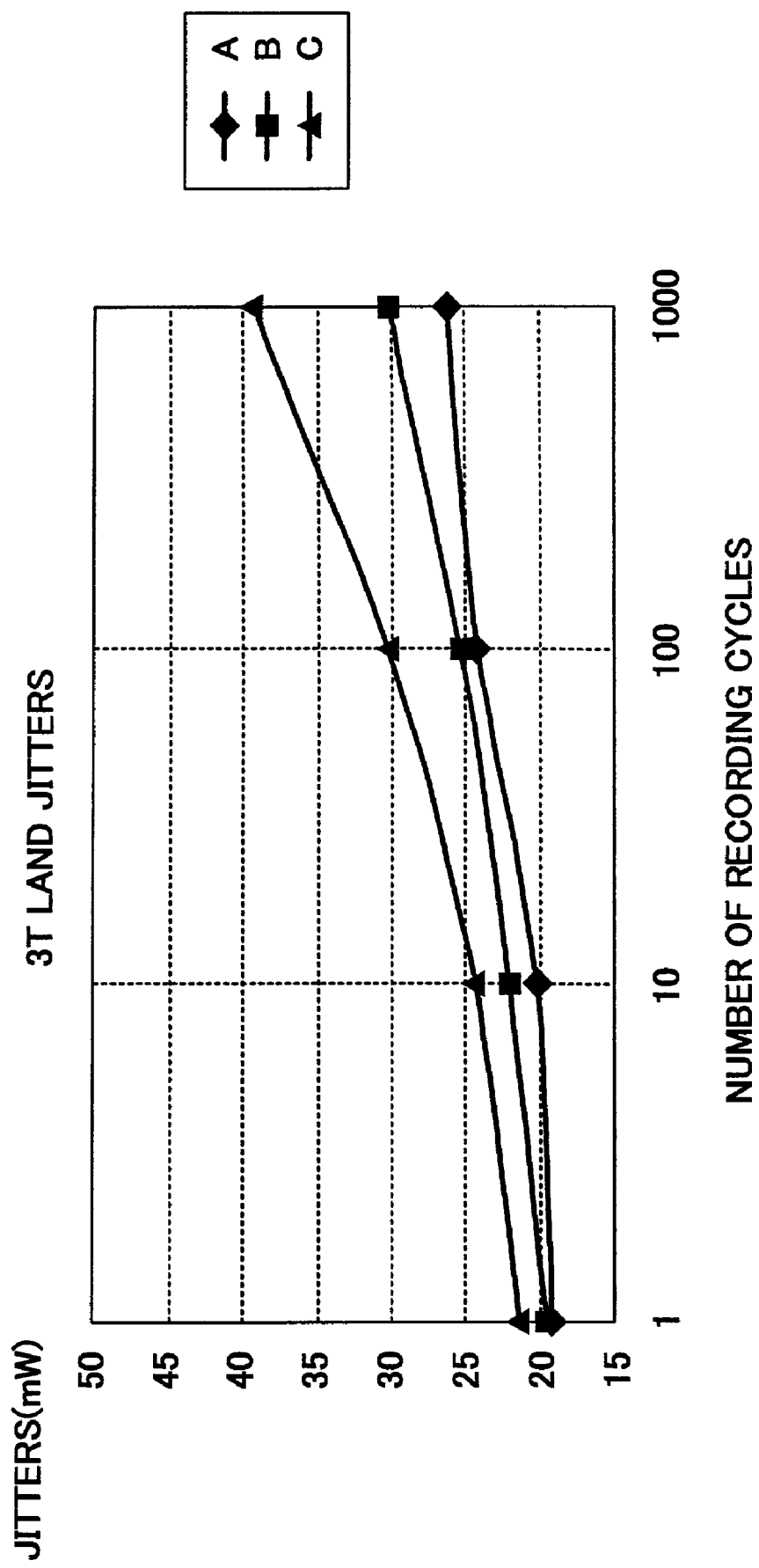
FIG. 17 includes graphical plots illustrating the change in 3T land jitters with the number of recording cycles repeated through up to 1000 times obtained from the measurements of recording media disclosed herein.

The results obtained from the 3T land jitter measurements for the sample discs A, B and C are shown in FIG. 15, and the change in 3T land jitter with recording power is shown in FIG. 16. In addition, the results on the change in 3T land jitter with the number of recording cycles repeated through 1000 times are shown in FIG. 17.

Among the sample discs A, B and C, the disc sample A with the smallest $v_0$ has lower jitters, which is indicative of its satisfactory recording quality. In contrast, the disc sample C with the highest $v_0$ has larger jitters, and its 3T land jitters are found to exceeds 35 ns at 300 times of recording cycles.

In a similar manner to Example 1, 3T land jitter values after 1000 times repeated recording cycles were compared for all disc samples considering the relation, 3T land jitter <35 nsec, it is found that excellent recording characteristics at the velocity $v_{WL}$ are achieved under the condition:

$v_0 < 14.4$ m/sec=3.0 $v_{WL}$.

TABLE 1

| | | | | | | | $v_{WH}$: 12.0 m/s | $v_{WL}$: 4.8 m/s |
|---|---|---|---|---|---|---|---|---|
| Disc sample | $v_0$ | $\Delta v_0/v_0$ | $R_A$ | $R_B$ | $R_B/R_A$ | 11T Modulation factor | 3T Land jitters (after 1000 times) | 3T Land jitters (after 1000 times) |
| A | 8.0 | 0.46 | 0.190 | 0.075 | 0.395 | 0.64 | 60.0 | 26.2 |
| B | 12.0 | 0.29 | 0.185 | 0.078 | 0.422 | 0.62 | 30.3 | 30.4 |
| C | 15.0 | 0.23 | 0.180 | 0.081 | 0.450 | 0.60 | 28.5 | 39.5 |
| D | 12.0 | 0.47 | 0.180 | 0.082 | 0.456 | 0.61 | 38.0 | 32.2 |
| E | 12.0 | 0.33 | 0.190 | 0.120 | 0.632 | 0.59 | 31.2 | 31.5 |
| F | 8.5 | 0.38 | 0.190 | 0.082 | 0.432 | 0.61 | 33.8 | 26.9 |
| G | 14.0 | 0.32 | 0.185 | 0.110 | 0.595 | 0.60 | 29.2 | 34.2 |
| H | 12.0 | 0.38 | 0.180 | 0.080 | 0.444 | 0.61 | 34.0 | 30.1 |

Example 3

In order to examine in detail the aforementioned reflectivity related functions, $R(P_E)$ and $R_1(P_E)$, several recording media were formed and then subjected to characteristic measurements.

As shown in FIG. 1, each of the recording media includes at least a transparent disc shaped substrate, provided with guide tracks of a continues spiral groove, and contiguous layers formed thereon in order as follows: A lower dielectric layer, a recording layer, an upper dielectric layer, a reflective/heat dissipating layer, and an overcoat layer.

Using polycarbonate as the substrate material, the transparent substrate had a thickness of 1.2 mm and was provided with the grooves having a depth of 30 nm and a pitch of 1.6 μm in a similar manner to conventional compact discs.

On the substrate, the lower dielectric layer was formed by RF sputtering method having a $SiO_2.ZnS$ composition (80:20, in molar ratio), and its thickness was found as 90 nm.

The recording layer was subsequently formed on the lower dielectric layer by DC magnetron sputtering method, having a AgInSbTe alloy composition with a thickness of 20 nm. The alloy composition was adjusted within the following range so as to yield different values of the aforementioned $R(P_E)$, to subsequently be incorporated into respective recording media. Namely, the alloy composition was $(Ag)_\alpha (In)_\beta (Sb)_\gamma (Te)_\delta$, with $0.1 \leq \alpha \leq 7.0$, $2.0 \leq \beta \leq 10.0$ $64.0 \leq \gamma \leq 92.0$, and $5.0 \leq \delta \leq 26.0$.

Subsequently, the upper dielectric layer was formed in a similar manner to the lower dielectric layer, and its thickness was found as 30 nm.

In addition, the overcoat layer was formed on the upper dielectric layer. As the material for forming the overcoat layer, UV curing acrylic resin was used which was commercially available in use for optical discs. The acrylic resin was first spin coated and subsequently cured under UV light irradiation in gaseous nitrogen atmosphere. The thickness of thus formed overcoat layer was found ranging from 10 μm to 20 μm.

Respective recording media were thus formed with these layers. Subsequently, these recording media, or disc samples, were each initialized using a commercially available CD-RW initialization apparatus equipped with a high power semiconductor laser device. These disc samples, A through E, were each found to have reflectivity values at the portions on the groove ranging from 15% to 25%.

Furthermore, these disc samples were each irradiated at linear scanning velocities such as 9.6 m/sec, 14.4 m/sec and 19.2 m/sec, and with various magnitude of erase power $P_E$ ranging from 10 mW to 20 mW.

Figure 18:
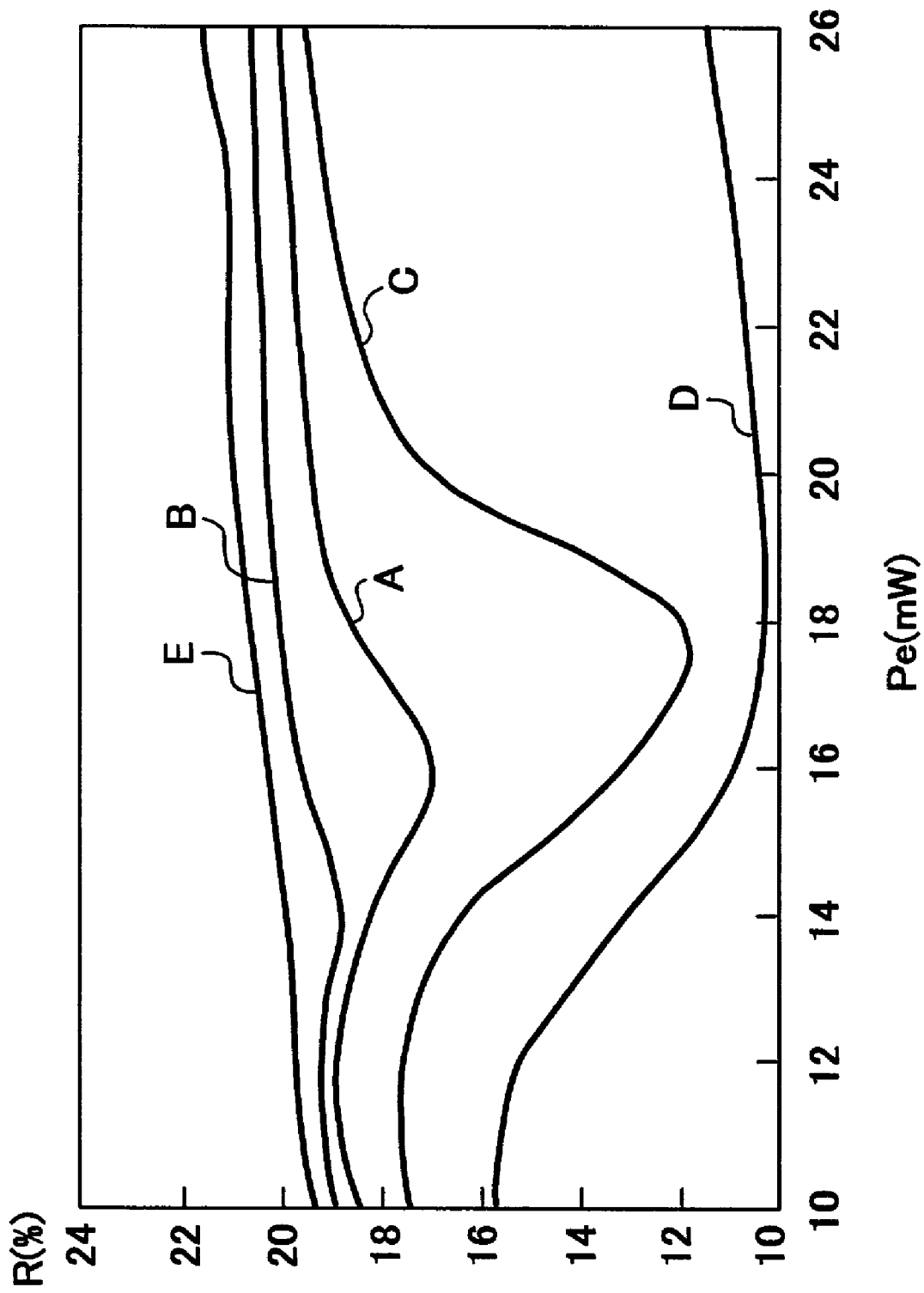
FIG. 18 includes graphical plots illustrating the results on the change in the reflectivity $R(P_E)$ with erase power $P_E$ obtained for several recording media irradiated at linear velocity of 9.6 m/sec.
Figure 19:
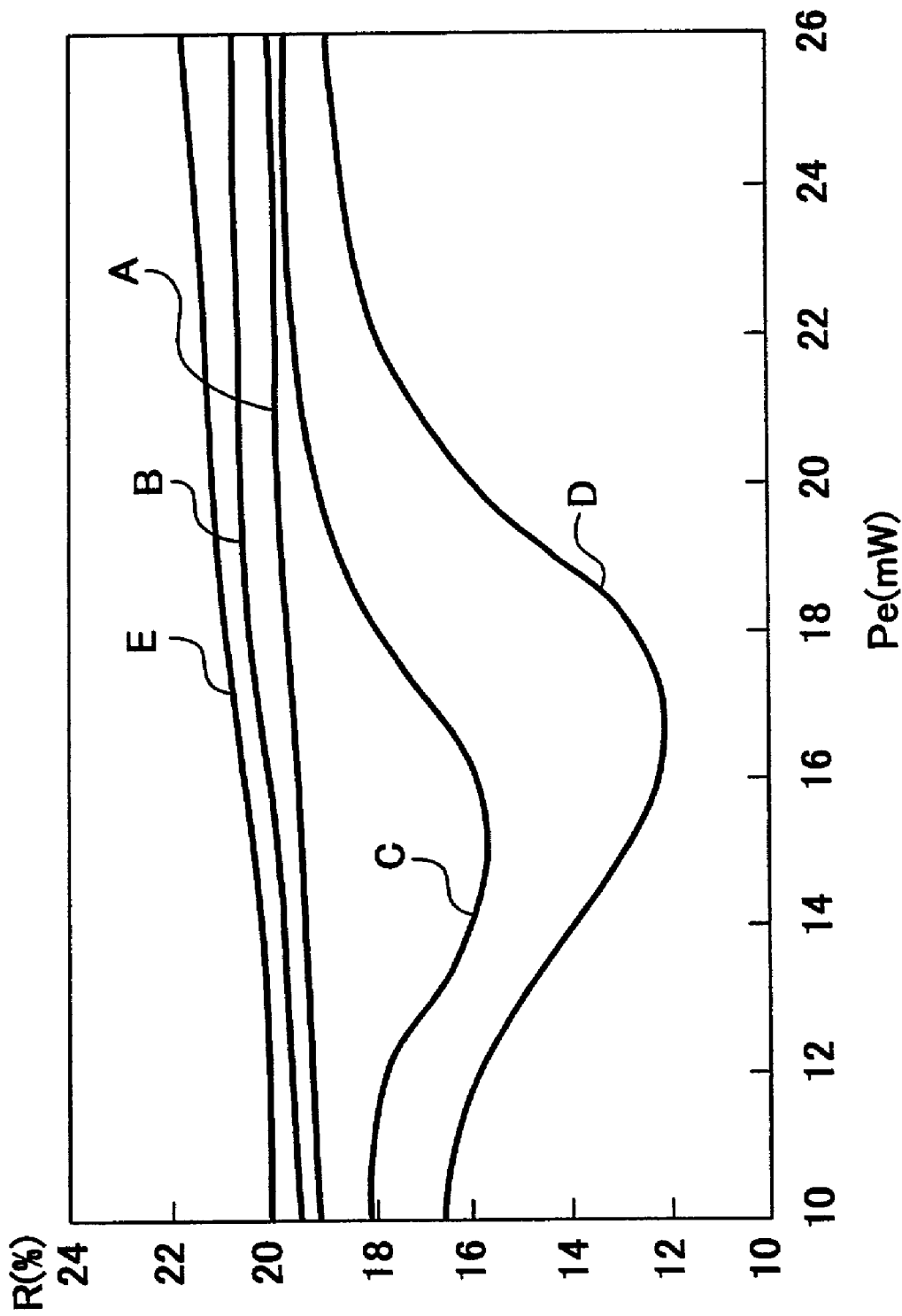
FIG. 19 includes graphical plots illustrating the results on the change in the reflectivity $R(P_E)$ with erase power $P_E$ obtained for several recording media irradiated at linear velocity of 14.4 m/sec.
Figure 20:
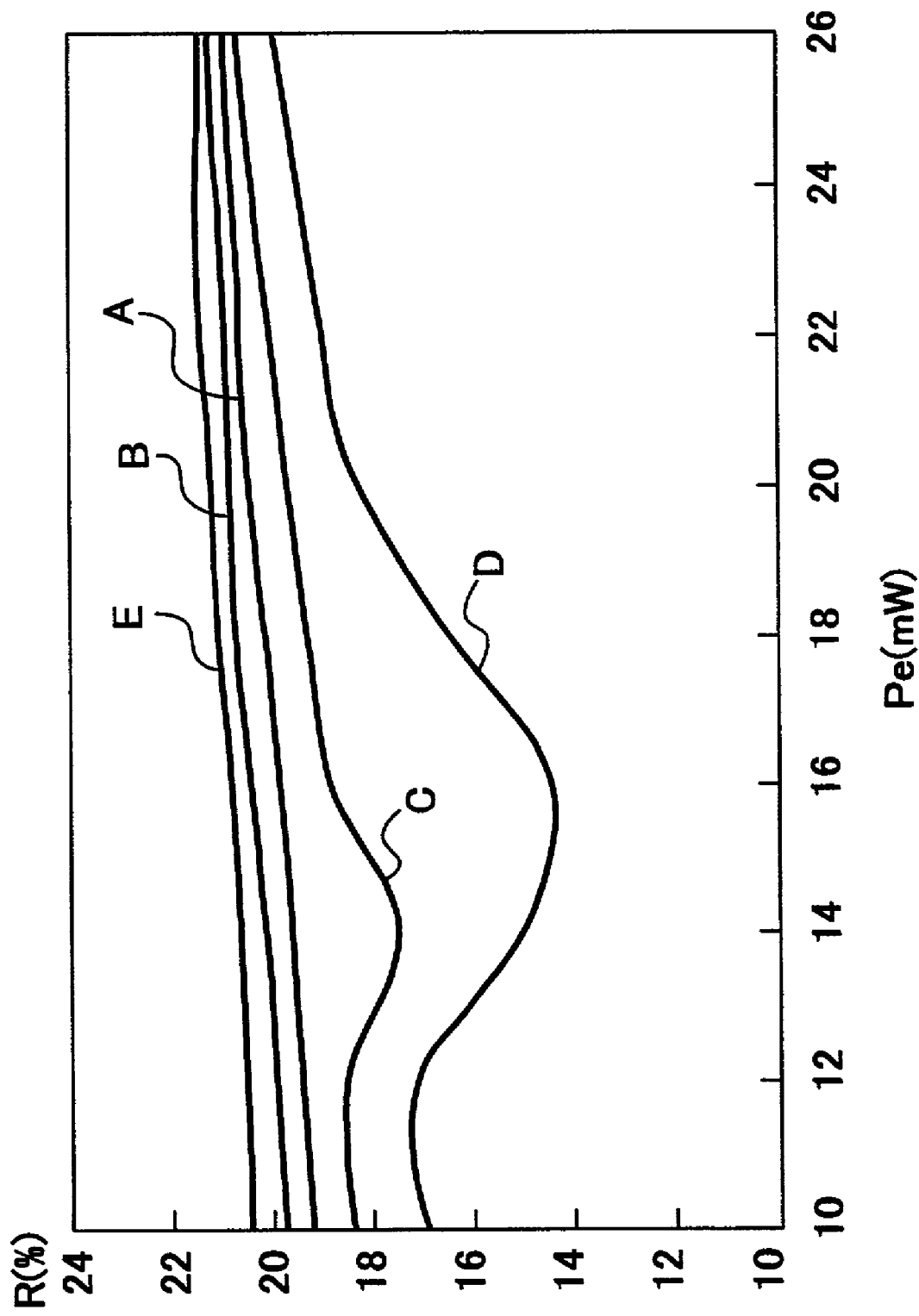
FIG. 20 includes graphical plots illustrating the results on the change in the reflectivity $R(P_E)$ with erase power $P_E$ obtained for several recording media irradiated at linear velocity of 19.2 m/sec.

Subsequently, reflectivity measurements were carried out with $P_R$=0.7 mW for the disc samples. The results obtained from the measurements are shown for scanning linear velocities of 9.6 m/sec, 14.4 m/sec and 19.2 m/sec, in FIGS. 18, 19, and 20, respectively.

In addition, the values at the power $P_{E0}$, of reflectivity $R(P_E)$ and asymptotic function $R_1(P_E)$ together with their ratios are shown in Table 2. It is noted, for disc samples for which no minimum is found in $R(P_E)$ versus $P_E$ curve, the values are herein abbreviated in the table.

TABLE 2

| Linear scanning velocity | Disc sample | $P_{E0}$ (mW) | $R_1(P_{E0})$ | $R(P_{E0})$ | $R_1(P_{E0})/R(P_{E0})$ |
|---|---|---|---|---|---|
| 19.2 m/sec | A | 16.0 | 19.0 | 17.0 | 1.12 |
|  | B | 17.5 | 19.5 | 18.9 | 1.03 |
|  | C | 14.0 | 18.0 | 12.0 | 1.50 |
| 14.4 m/sec | C | 15.0 | 19.0 | 15.5 | 1.23 |
|  | D | 17.0 | 17.0 | 12.0 | 1.42 |
| 9.6 m/sec | C | 14.0 | 19.0 | 17.5 | 1.09 |
|  | D | 15.0 | 17.5 | 14.0 | 1.24 |

In addition, the disc samples were subjected to recording process steps at linear scanning velocities 9.6 m/sec, 14.4 m/sec and 19.2 m/sec, using a spindle tester type measurement apparatus in use for CDs. An optical pickup similar in specification to that used in reflectivity measurements was used in the recording steps.

According to the specification described for rewritable compact discs in the Orange Book, Part III, Vol. 2, the recording was carried out using random patterns which were formed with the signals modulated according to the EFM method.

As the recording strategies, the EFM standard clock periods T were adopted as 28.93 nsec, 19.23 nsec and 14.46 nsec, for linear scanning velocities of 9.6 m/sec (CD8×speed), 14.4 m/sec (CD12×speed), and 19.2 m/sec (CD16×speed), respectively. Included also in the strategies was the ratio of pulse-on time length $T_{mp}$ to the standard clock period, $T_{mp}/T$, to be 0.50.

Among the disc samples presently examined, the recording was succeeded for these samples shown in Table 3.

TABLE 3

| Linear scanning velocity | Disc samples successfully recorded |
|---|---|
| 9.6 m/sec | A, C, D |
| 14.4 m/sec | A, B, C, D |
| 19.2 m/sec | A, B, C |

For other samples, decordable EFM signals could not be recorded.

Furthermore, among disc samples included in Table 3, those included in the following Table 4 were found with 3T jitters of 10% or less (against one half of pulse length) after overwrite.

TABLE 4

| Linear scanning velocity | Disc samples with 3T jitters of 10% or less after overwrite |
|---|---|
| 9.6 m/sec | A, C, D |
| 14.4 m/sec | A, B, C |
| 19.2 m/sec | A, B |

Figure 21:
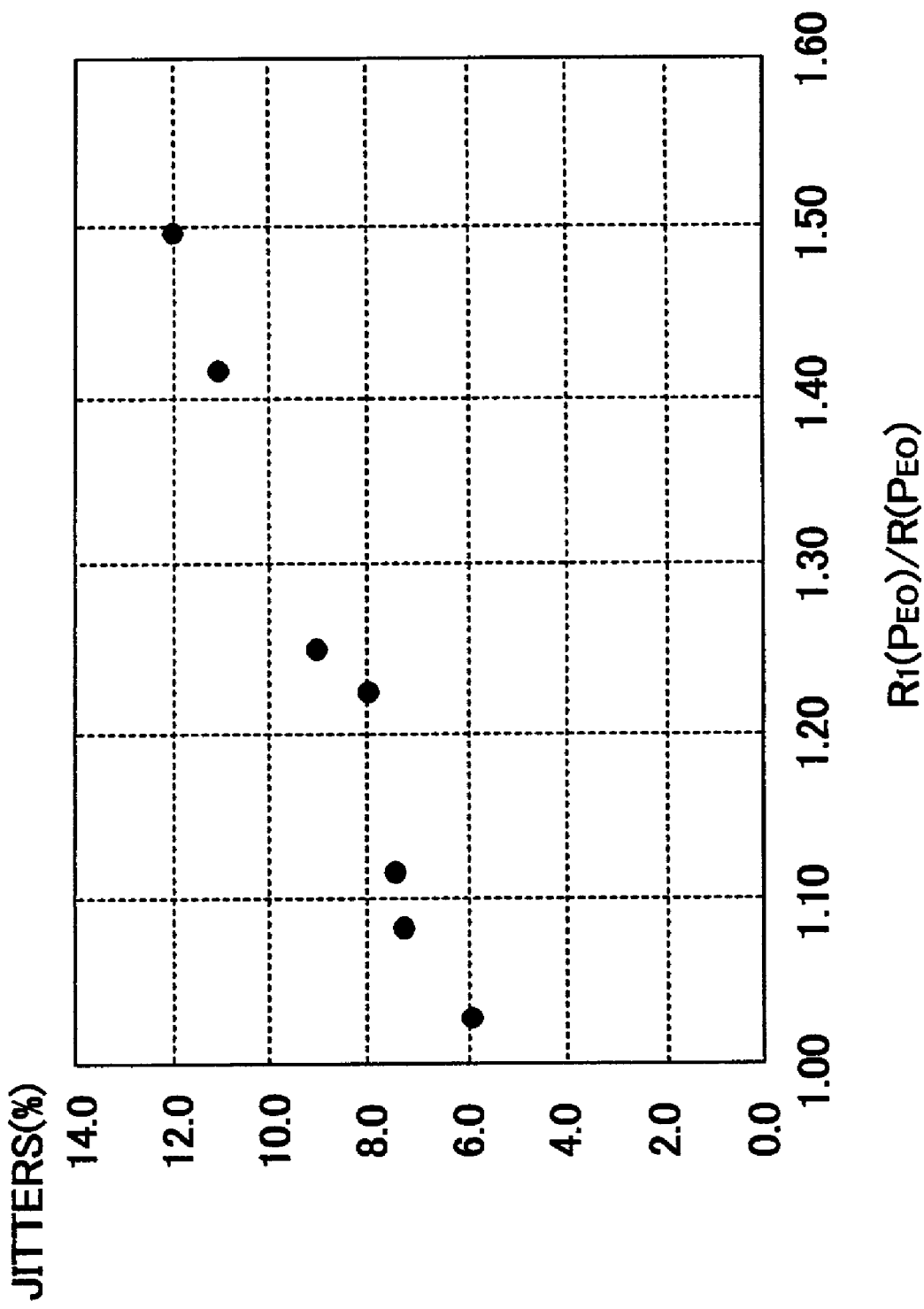
FIG. 21 shows the 3T jitter results with the ratio $R_1(P_{E0})/R(P_{E0})$ obtained for several recording media disclosed herein.

From the results described herein above and shown in FIG. 21, it is indicated that excellent characteristics after the first direct overwrite can be achieved by satisfying the relation, $R_1(P_{E0})/R(P_{E0}) < 1.4$.

Still further, among disc samples included in Table 4, those included in the following Table 5 were found with 11T modulation factor of 0.55 or larger.

TABLE 5

| Linear scanning velocity | Disc samples with 11T modulation factor of 0.55 or larger |
|---|---|
| 9.6 m/sec | C, D |
| 14.4 m/sec | C |
| 19.2 m/sec | A |

Figure 22:
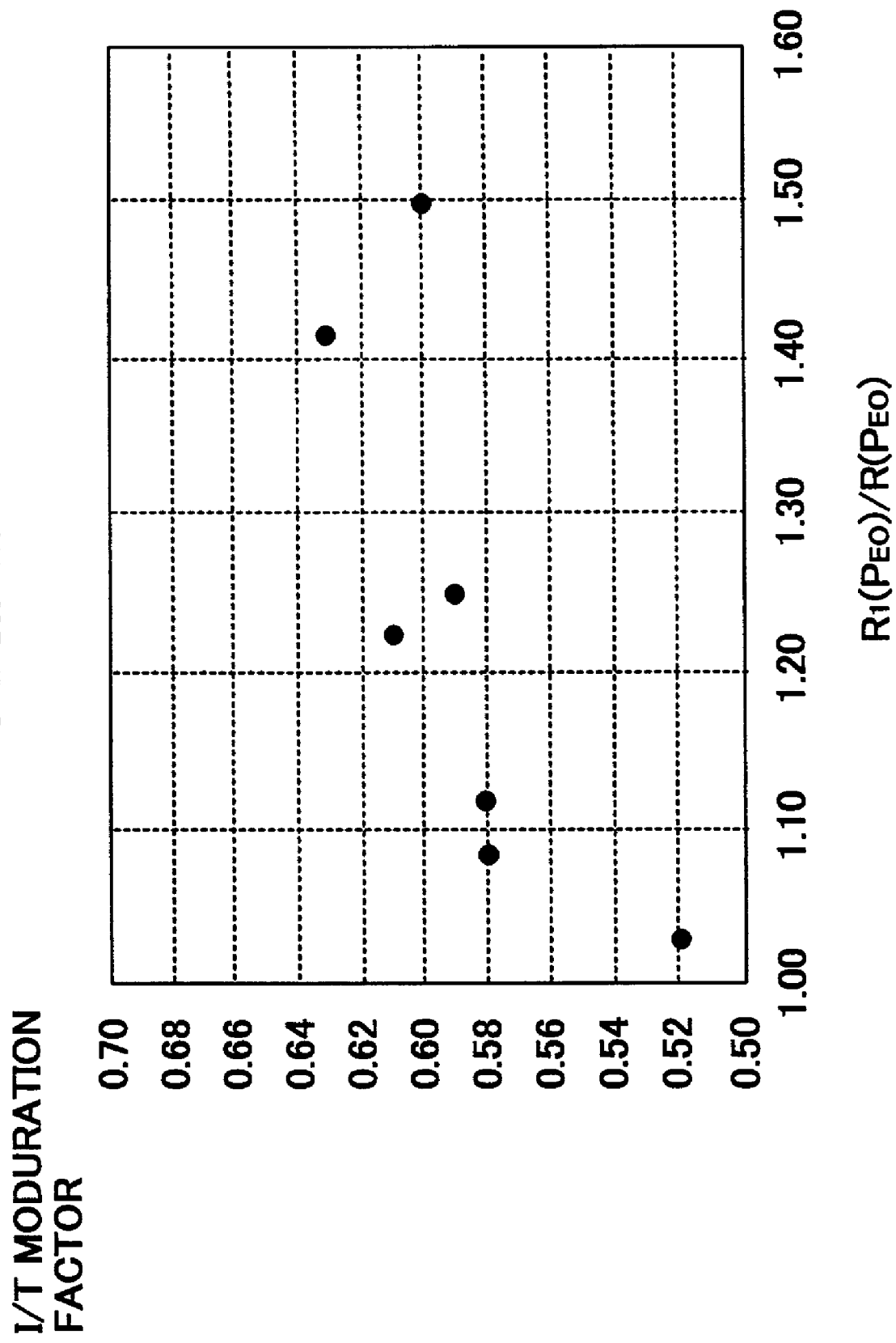
FIG. 22 shows the 11T modulation factor results with the ratio $R_1(P_{E0})/R(P_{E0})$ obtained for several recording media disclosed herein.

From the results described above and shown in FIG. 22, it is indicated that the conditions for achieving suitable recording characteristics are fulfilled by satisfying the relation, $R_1(P_{E0})/R(P_{E0})>1.05$.

Example 4 (II)

In order to examine in detail the aforementioned activation energy of deterioration, $E_a$, several recording media were formed as follows.

Each of the recording media was prepared including at least a transparent disc shaped substrate in use for CD-RW discs, provided with guide tracks of a continues spiral groove, and contiguous layers formed thereon in order as follows: A lower dielectric layer, a recording layer, an upper dielectric layer, a reflective layer, and a protective layer.

As the material for forming the dielectric layers, a $SiO_2 \cdot ZnS$ composition was used. The lower and upper dielectric layers were formed by RF sputtering, having a thickness of 90 nm and 30 nm, respectively.

Using an AgInSbTe alloy composition, the recording layer was subsequently formed on the lower dielectric layer by DC magnetron sputtering method, having a thickness of 15 nm. The alloy composition was adjusted within the following range so as to yield different values of the activation energy of deterioration, $E_a$, to subsequently be incorporated into respective recording media. Namely, the alloy composition was $(Ag \text{ or } Ge)_\alpha (In)_\beta (Sb)_\gamma (Te)_\delta$ in atomic percent, with $0.1 \leq \alpha \leq 7.0$, $2.0 \leq \beta \leq 10.0$ $64.0 \leq \gamma \leq 92.0$, and $5.0 \leq \delta \leq 26.0$, provided that $\alpha+\beta+\gamma+\delta \geq 97$.

Subsequently, on the upper dielectric layer, the reflective layer was formed using an AlTi alloy composition by DC magnetron sputtering, having a thickness of 150 nm.

In addition, the protective layer was formed on the upper dielectric layer. Using UV curing resin as the material for the formation, by first spin coating and subsequently curing the resinous layer under UV light irradiation, the protective layer was formed having a thickness of approximately 30 μm.

The thus prepared recording media samples, A through D, were formed each having different activation energies of deterioration, and found as CD-RW discs in conformity to the specifications described in the Orange Book, Part III, Vol. 2.

The values for the activation energy of deterioration, $E_a$, were obtained as follows. Namely, recording steps were carried out on the media samples, A through D, and the measurements were made of the readout signals. Subsequently, the media samples were subjected to the environmental test.

Recording steps and measurements were carried out using the Spin Tester DDU1000 as a CD-RW measurement apparatus equipped with an optical pickup unit operating under the following conditions:

λ: 795 nm in laser wavelength for recording,

NA; 0.5, recording power: 15.0 mW~25.0 mW, and readout power : 0.7 mW.

In addition, the linear recording velocity of 12.0 m/sec (CD10×) was adopted, which was the maximum velocity included in the Orange Book. Recording powers were determined according to the methods specified also in the Orange Book. Recording steps made for respective disc samples were an initial recording (i.e., recording made once onto non-recorded disc) and initial overwrite (recording made following the initial recording).

The readout steps were carried out at the nominal CD recording velocity of 1.2 m/sec (CD1×). Furthermore, the measurements were made on respective disc samples on asymmetry and 3T jitters. The results obtained from the measurements are shown in Table 6.

TABLE 6

| Disc sample | Initial results | | | After storage | |
|---|---|---|---|---|---|
| | Asymmetry A | Initial jitters | Overwrite jitters | $E_a$ | Life at 80° C. |
| A | −4.80% | 16.4 ns | 22.4 ns | 1.6 eV | 210 hrs |
| B | −5.20% | 17.3 ns | 23.8 ns | 1.7 eV | 300 hrs |
| C | −5.00% | 18.2 ns | 24.3 ns | 1.9 eV | 450 hrs |
| D | −4.70% | 19.4 ns | 32.3 ns | 2.8 eV | 632 hrs |
| E | −4.20% | 22.4 ns | 40.8 ns | 3.1 eV | 728 hrs |

Following the recording steps and measurements, the disc samples were subjected to the environmental tests which were carried out for 1000 hours at 70° C., 300 hours at 80° C., or 50 hours at 90° C. The relative humidity for each test was 85%.

The asymmetry values, A, were calculated by the equation (1) described earlier and the results are shown also in Table 6. Subsequently, activation energies are calculated according to the aforementioned equations, $k=dt/dA$ (2), and $k=k_0 \times \exp(E_a/k_B T)$ (3), where t is storage time, $k_B$ Boltzmann's constant and T storage temperature in degree in Kelvin. The activation energy results obtained from the calculation are shown also in Table 6.

In addition, C1 error measurements were made on the disc samples following the environmental test at 80° C., in which C1 error rates were obtained using a CD measurement apparatus, CD-CATS.

Since the value of 220 cps is given as the limit of the C1 error rate in the Orange Book, the period of time, at which the error rate exceeded 220 cps, was presently regarded as life at 80° C. for respective media. The thus obtained results on the life are shown also in Table 6 for respective samples.

It is indicated from the results included in Table 6, that the higher the activation energy, more difficult to crystallize, thereby resulting in longer life for the medium. In addition, since the practical life increases exponentially when the 80° C. temperature is converted to room temperature, the storage life is increased for the samples having larger $E_a$ values.

In contrast, it is known that overwrite jitters increases (i.e., overwrite characteristics deteriorate) with the increase in the $E_a$ value.

Considering the results shown in Table 6, in that the disc life at 80° C is 300 hours or longer and that overwrite jitters are 35 nsec or smaller, satisfactory characteristics are achieved presently for the disc samples, B, C and D. Accordingly, the activation energy desirable for achieving satisfactory media characteristics is considered in the range between 1.6 eV and 3.0 eV.

Example 5

In order to examine in detail the aforementioned activation energy of the boundary displacement, several recording media were formed in a similar manner to Example 4, with the exception that different compositions were adopted for the recording layers, which will be described herein below.

Each of CD-RW recording media was prepared including at least a transparent disc shaped substrate in use for CD-RW discs, provided with guide tracks of a continuos spiral groove, and contiguous layers formed thereon in order as follows: A lower dielectric layer, a recording layer, an upper dielectric layer, a reflective/ heat dissipating layer, and an overcoat layer.

As the material for forming the dielectric layers, a $SiO_2.ZnS$ composition was used. The lower and upper dielectric layers were formed by RF sputtering, having a thickness of 90 nm and 35 nm, respectively.

The recording layer was subsequently formed on the lower dielectric layer using two kinds of alloy compositions, one AgInSbTe alloy and the other the same added by Ge. The present CD-RW recording layers were then formed to have the composition of $(Ag)_\alpha (In)_\beta (Sb)_\gamma (Te)_\delta (Ge)_\epsilon$ in atomic percent, with $0.1 \leq \alpha \leq 7.0$, $2.0 \leq \beta \leq 10.0$ $64.0 \leq \gamma \leq 92.0$, $5.0 \leq \delta \leq 26.0$, and $0.0 \leq \epsilon \leq 7.0$, provided that $\alpha+\beta+\gamma+\delta \geq 97$, where $\epsilon \geq 0.1$ for $\alpha=0.0$, and $\alpha \geq 0.1$ for $\epsilon=0.0$. As a result, the recording layers were formed having various mixing ratios among the AgInSbTe, AgGeInSbTe and GeInSbTe compositions.

The recording layers were formed by the sputtering method in an atmosphere of Ar mixed with N. By suitably controlling the mixing ratios of Ar and N, the N content incorporated as impurities into the recording layer is appropriately controlled.

Further, the thickness of respective recording layers was adjusted ranging from 14 nm to 20 nm, to be incorporated into recording medium. Several recording media were formed having different values of the activation energy of boundary displacement, $E_a'$.

Subsequently, on the upper dielectric layer, the reflective/ heat dissipating layer was formed using an alloy composition of Al added by minute amount of Ti by DC magnetron sputtering, having a thickness of 150 nm.

The recording media were then initialized using a conventional CD-RW initialization apparatus.

The recording media were then initialized using a conventional CD-RW initialization apparatus.

The thus formed recording medial were found as CD-RW discs in conformity to the specifications described in the Orange Book. Part III. Vol. 2.

Subsequently, several steps were carried out for obtaining the activation energies. Namely, these sample media were first subjected to the environmental test which was carried out at high temperatures and high relative humidity, then the decrease in the area, S, of recorded marks was measured with time, whereby the activation energies were calculated.

As mentioned earlier, the amount of the decrease in the area, S, is proportional to that of modulation factor (Equation (4)). Therefore, the decrease in the modulation factor is measured in the present example to obtain the decrease in the area S, in which signal patterns consisting of 3T marks and 3T lands are recorded on the recording media and resultant 3T modulation factors are regarded as the primary parameter for the decrease of the area S.

During the recording and measuring steps, the CD-RW spindle tester, Model DDU1000, was used equipped with an optical pickup operable under the conditions, λ: 780 nm in laser wavelength, and NA: 0.50.

With the spindle tester, the signal patterns consisting of 3T marks and 3T lands were recorded at the linear recording velocity of 12.0 m/sec (CD10×) according the recording strategies specified by the Orange Book.

In addition, the recording was made in an inner circular area on the disc approximately 25 mm away from the center, to thereby be able to minimize the effect of disc warping on the signal measurements following the environmental tests. The 3T modulation factors, m3, were then measured from the signals readout by the same apparatus.

Following these measurements, the recording media were subjected to environmental tests under the conditions shown in Table 7 (environments, A, B and C), and similar measurements were carried out on respective media samples.

TABLE 7

| | |
|---|---|
| Environment A | Temperature 70° C. (343 K), relative humidity 85%, 1000 hrs. |
| Environment B | Temperature 80° C. (353 K), relative humidity 85%, 500 hrs. |
| Environment C | Temperature 90° C. (363 K), relative humidity 85%, 50 hrs. |

The thus tested disc samples were again measured on the 3T modulation factors, m3. The m3 results obtained from the measurements show slight decrease from initial values, which is indicative of the advance in crystallization in the recording layer.

Indicating the 3T modulation factors after the test as $3m_1$, activation energies are obtained from the relation $$-dm3/dt = (m3-3m_1)/t_0, \text{tm (5)}$$

where $t_0$ is the period of time for the tests.

Figure 23:
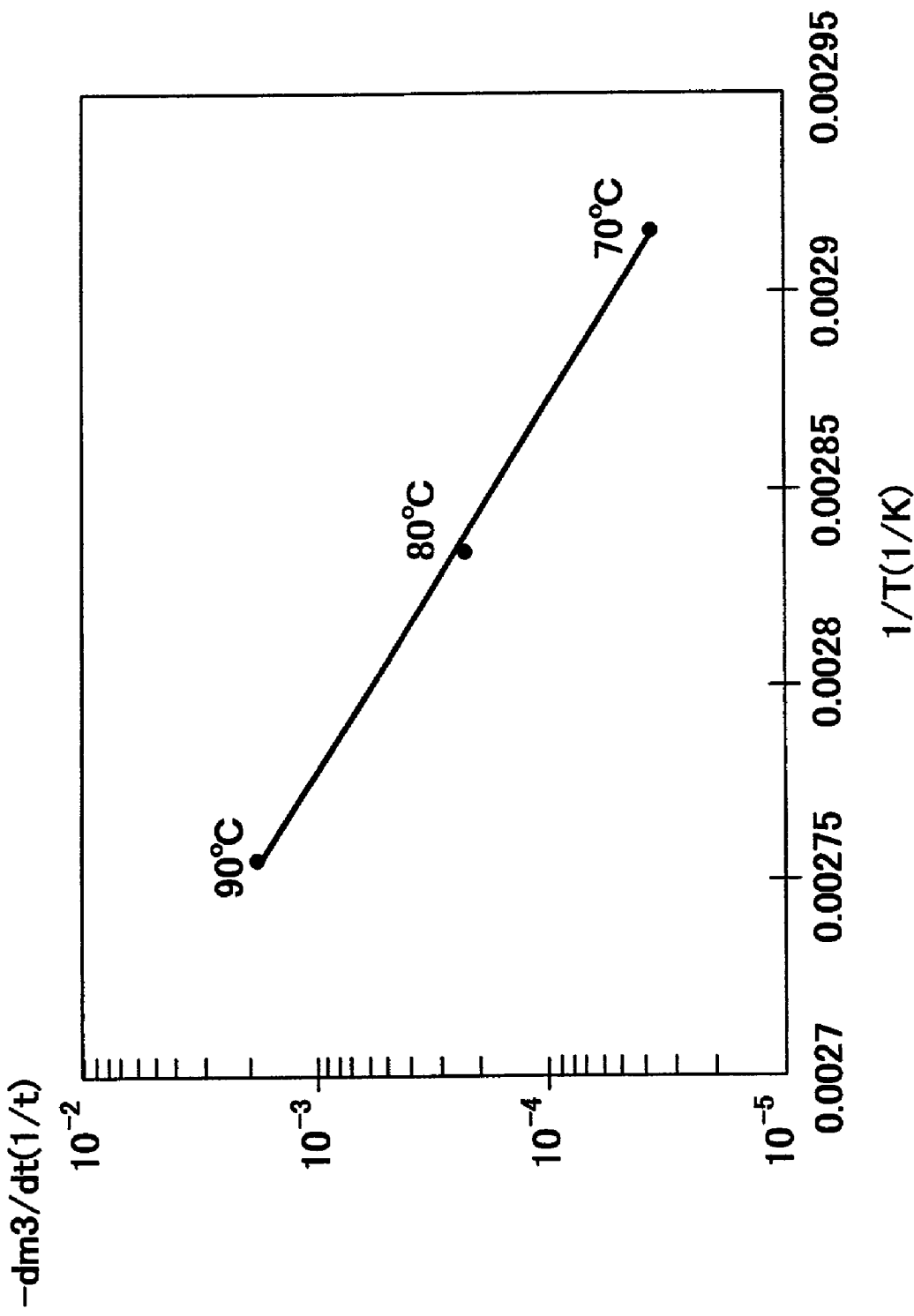
FIG. 23 includes a graphical plot illustrating the change in {−dm3/dt} values for respective media samples with storage temperature T.

The activation energies, $E_a'$, can therefore be obtained from the slope of the graphical plot according to the Arrhenius' equation with respect to the $-dm3/dt$ values for respective media samples after the tests under the conditions, A, B and C, as illustrated in FIG. 23.

The graphical plot in FIG. 23 indicates the rate of decrease in the parameter m3 is expressed by the Arrhenius' relation. This indicates, in turn, that the crystallization is caused by the displacement of the amorphous-crystalline boundary and the activation energy of the displacement is expressed by the relation (4).

For the sample, of which results are shown in FIG. 23, an activation energy was obtained as $E_a'=2.41$ eV, and the activation energies obtained for other samples were found ranging from 0.6 eV to 3.0 eV.

In order to compare media characteristics with the thus obtained $E_a'$ values, the recording media (as formed or without the environment test) were subjected to several measurements to obtain recording and overwrite characteristics.

The recording was carried out using the above noted spindle tester with EFM recording signals which can be readout by conventional CD-RW drives. In addition, the recording was made on the first overwrite and 1000 times repeated overwrite, and then 3T jitters were measured by a similar apparatus.

Figure 24:
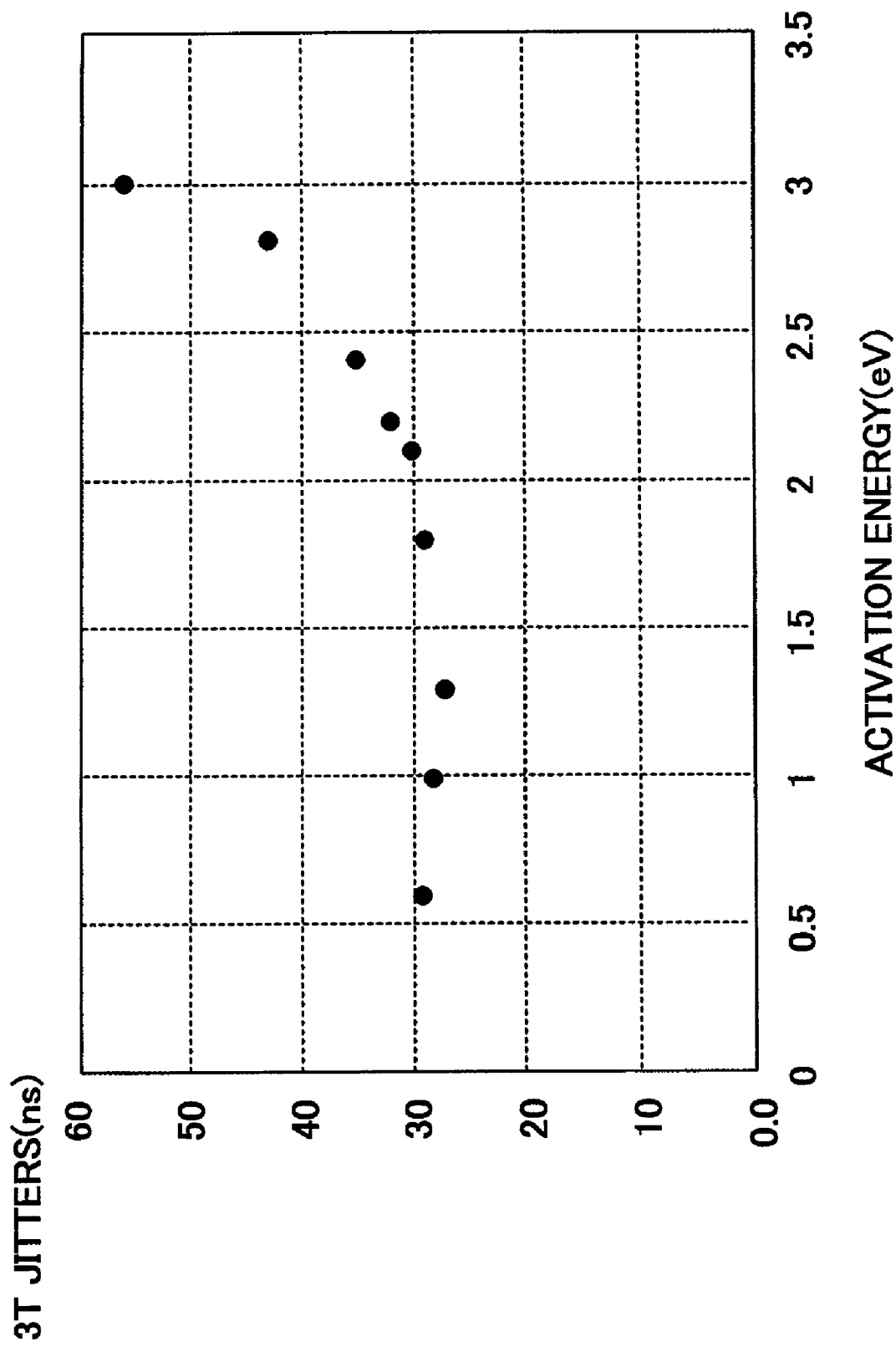
FIG. 24 shows the results obtained from the measurements on the change in 3T jitters with $E_a$.

The results obtained from the measurements are shown in FIG. 24, illustrating the change in 3T jitters with $E_a'$. It is indicated from the results that the jitters show a sharp increase for the $E_a'$ value exceeding approximately 2.4 eV.

In addition, for the media samples with $E_a'$ values less than 1.0 eV, it is also shown from the results separately obtained that the storage life at 70° C. is found to be less than 500 hours, thereby indicating a considerable deterioration in the storage durability.

Therefore, from the results described herein above, it is indicated that the activation energy of the boundary displacement is preferably in the range from 1.0 eV to 2.4 eV.

It is apparent from the above description including the examples, for the optical information recording media disclosed herein, several parameters were defined such as critical relative velocity for phase change $v_0$, margin of critical velocity for phase change $\Delta v_0$, maximum and minimum relative velocities are $v_{WH}$ and $v_{WL}$, saturated reflectivity values, $R_A$ and $R_B$, at the high v and low v regions, respectively.

Since these parameters are optimized respectively with respect to recording media properties and record/readout operating conditions, they are effectively utilized for achieving various excellent disc characteristics of recorded signal after repeated recording cycles, readout signals having high contrast, S/N ratios, and large amplitudes, among others, thus enabling information recording in the CAV mode on 120 mm CD discs in the range of disc diameter from 46.5 mm to 116 mm, for example.

In addition, for the optical information recording media disclosed herein, several functional relations were defined such as reflectivity of the recording layer as a function of erase power, $R(P_E)$; the ratio $R_1(P_{E0})/R(P_{E0})$, with the function, $R_1(P_E)$, defined as the straight line asymptotic to the function $R(P_E)$, and the optimum irradiation power $P_{E0}$ at which a minimum of $R(P_E)$ versus $P_E$ curve is found; and the slope, $dR_1(P_E)/dP_E$.

By utilizing these relations and adjusting various parameters within predetermined ranges, for example, $R_1(P_{E0})/R(P_{E0})<1.4$ and $dR_1(P_E)/dP_E\}>0.001\%$ /mW, the media properties can be optimized, thereby facilitating to achieve high signal contrasts and improve overwrite characteristics, among others.

Furthermore, for the recording layer included in the optical information recording media disclosed herein, it is indicated that the activation energy of deterioration can be calculated utilizing the asymmetry as a parameter. The activation energy can be obtained for the recording layer not as a single isolated layer but as a layer incorporated into an actual recording medium. Therefore, by devising recording media to have an activation energy of 1.6 eV or larger, excellent media characteristics can be achieved in recording at high recording velocities, and storage durability at least at room temperature.

For the recording layer included in the optical information recording media, it is also indicated that the change, which is generated in the recording layer during recording, readout, and erase steps according to the mark length modulation recording method, is adequately characterized by the displacement of the boundary between the amorphous regions as recorded marks and crystalline regions as erased portions.

The activation energy of the displacement is presently obtained to be less than 2.4 eV, by approximating the rate of decrease in the area, S, of the amorphous regions per unit time using Arrhenius' relation. By devising recording media to have such activation energies of the boundary displacement ranging from 1.0 eV to 2.4 eV, excellent media characteristics can be achieved in overwrite characteristics and storage durability.

The process steps set forth in the present description on the constituent layer formation and various recording media measurements may be implemented using conventional general purpose microprocessors, programmed according to the teachings in the present specification, as will be appreciated to those skilled in the relevant arts. Appropriate software coding can readily be prepared by skilled programmers based on the teachings of the present disclosure, as will also be apparent to those skilled in the relevant arts.

The present specification thus include also a computer-based product which may be hosted on a storage medium, and include instructions which can be used to program a microprocessor to perform a process in accordance with the present disclosure. This storage medium can include, but not limited to, any type of disc including floppy discs, optical discs, CD-ROMs, magneto-optical discs, ROMs, RAMs, EPROMs, EEPROMs, flash memory, magnetic or optical cards, or any type of media suitable for storing electronic instructions.

Obviously, numerous additional modifications and variations of the embodiments described above are possible in light of the above teachings. It is therefore to be understood that within the scope of the appended claims, the present disclosure may be practiced otherwise than as specifically described herein.

This document claims priority and contains subject matter related to Japanese Patent Applications No. 2001-26094, 2001-67689, 2001-83650 and 2001-83651, filed with the Japanese Patent Office on Feb. 1, 2001, Mar. 9, 2001, Mar. 22, 2001 and Mar. 22, 2001, respectively, the entire contents of which are hereby incorporated by reference.

What is claimed is:

1. A phase change optical recording medium for implementing at least recording and readout steps on information data by electromagnetic radiation, utilizing a change in reflectivity, $R=R(v)$, of said recording medium during said readout steps, said recording medium and an optical unit moving relative to each other during said recording steps at a relative velocity, v, ranging from minimum to maximum relative velocities warranted for said recording medium, $v_{WL}$ and $v_{WH}$, respectively, wherein said recording medium comprises a substrate and at least one recording layer, wherein said at least one recording layer has a thickness in a range of 13 nm to 17 nm, wherein $v_{WH} \geq 10.0$ m/s, wherein said at least one recording layer includes at least a recording material essentially consisting of Ag, In, Sb, Te and an additive selected from a group consisting of B, N, C, O, Si, Ga, Ge, S, Se, Al, Fe, Co, Ni, Cu, Zn, Sn, Pd, Pt and Au, with a proportion in atomic percent of $\alpha$(Ag): $\beta$(In): $\gamma$(Sb): $\delta$(Te): $\epsilon$(additive), with $0.1 \leq \alpha \leq 3.0$, $5.0 \leq \beta \leq 12.0$, $60.0 \leq \gamma \leq 72.0$, and $22.0 \leq \delta \leq 30.0$, provided that $\alpha+\beta+\gamma+\delta \geq 97$, wherein said recording medium is operable for recording at a velocity of 12.0 m/s, wherein, when said optical unit is operated under conditions of record/readout wavelength of 789 nm and numerical aperture of 0.49, a critical relative velocity of phase change, $v_0$, which is defined by a value of v, at which a differential coefficient, $-dR(v)/dv$, reaches a maximum, satisfies a relation $v_0 \geq 0.7 v_{WH}$, where the reflectivity, $R(v)$, of said recording medium is measured by said optical unit during a DC mode irradiation of electromagnetic radiation at a power $P_E=0.75$ $P_{OH}$ and at said relative velocity, $v_{WH}$, with $P_{OH}$ being an optimum recording power at said maximum relative velocity $V_{WH}$, said reflectivity, R(v), changing with v from one saturated value at a low v region, $R_A$, to another saturated value at a high v region, $R_B$, and wherein a normal recording velocity is 1.2 m/sec (CD 1×).

2. The phase change optical recording medium according to claim 1, wherein said critical relative velocity of phase change, $v_0$, satisfies a relation, $v_0 \leqq 3.0\, v_{WL}$.

3. The phase change optical recording medium according to claim 1, wherein a margin of critical velocity for phase change, $\Delta v_0$, which is defined by a half width of a $-dR(v)/dv$ versus v curve, satisfies a relation, $\Delta v_0/v_0 < 0.4$.

4. The phase change optical recording medium according to claim 1, wherein reflectivity values $R_A'$ and $R_B'$, which are obtained during readout steps, satisfy a relation, $0.1 < R_A'/R_B' < 0.6$, where $R_A'$ and $R_B'$ are saturated values of a reflectivity, R', obtained during readout steps, at high v and low v regions, respectively.

5. The phase change optical recording medium according to claim 1, wherein said maximum and minimum relative velocities, $v_{WH}$ and $v_{WL}$, satisfy a relation, $v_{WH}/v_{WL} \geqq 2.5$.

* * * * *